(12) United States Patent
Lee et al.

(10) Patent No.: US 12,067,917 B2
(45) Date of Patent: Aug. 20, 2024

(54) DISPLAY DEVICE AND METHOD FOR DRIVING THE SAME

(71) Applicant: SAMSUNG DISPLAY CO., LTD., Yongin-si (KR)

(72) Inventors: Soon Gyu Lee, Yongin-si (KR); Jin Woo Kim, Yongin-si (KR); Jin A Kang, Yongin-si (KR); Young Sik Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/164,280

(22) Filed: Feb. 3, 2023

(65) Prior Publication Data

US 2023/0177997 A1 Jun. 8, 2023

Related U.S. Application Data

(62) Division of application No. 17/224,421, filed on Apr. 7, 2021, now Pat. No. 11,574,505.

(30) Foreign Application Priority Data

Jun. 22, 2020 (KR) ........................ 10-2020-0076007

(51) Int. Cl.
*G09G 3/20* (2006.01)
*G06F 3/044* (2006.01)
(Continued)

(52) U.S. Cl.
CPC .............. *G09G 3/20* (2013.01); *G06F 3/044* (2013.01); *G06V 10/141* (2022.01);
(Continued)

(58) Field of Classification Search
CPC ....... G06V 40/40–45; G06V 40/60–67; G06V 40/1318; G06V 40/1365–1376; G06V 40/1382–1394
See application file for complete search history.

(56) References Cited

U.S. PATENT DOCUMENTS 10,296,775 B2 * 5/2019 Reinhold ................ G06F 3/042
10,713,512 B2 * 7/2020 Kim .................... G06V 40/1382
(Continued)

FOREIGN PATENT DOCUMENTS

KR 10-2017-0136359 12/2017
KR 10-2021-0029891 3/2021
(Continued)

OTHER PUBLICATIONS

Soon-Gyu Lee et al., Presentation Material "Spoof Detection scheme for optical fingerprint sensor under display", SID 2020, Session 42, Aug. 5, 2020.
(Continued)

*Primary Examiner* — Michael Pervan
(74) *Attorney, Agent, or Firm* — F. Chau & Associates, LLC

(57) ABSTRACT

A method for driving a display device is performed by the display device. The method includes: displaying a first image including user convenience information through a display panel; generating sensing data corresponding to a fingerprint sensing area by using a photoelectric sensor; and determining whether a sensed fingerprint corresponding to the sensing data is a fake fingerprint by comparing expected sensing light illuminance information based on the first image with sensed light illuminance information of the sensing data. The first image includes a first color pattern in the fingerprint sensing area of the display panel. A fake-determination image pattern includes the first color pattern
(Continued)

and a second color pattern different from the first color pattern.

20 Claims, 24 Drawing Sheets

(51) Int. Cl.
    *G06V 10/141* (2022.01)
    *G06V 40/12* (2022.01)
    *G06V 40/13* (2022.01)
    *G06V 40/40* (2022.01)
    *G06V 40/60* (2022.01)
    *G09G 5/10* (2006.01)

(52) U.S. Cl.
    CPC ...... *G06V 40/1318* (2022.01); *G06V 40/1365* (2022.01); *G06V 40/1382* (2022.01); *G06V 40/40* (2022.01); *G06V 40/67* (2022.01); *G09G 3/2003* (2013.01); *G09G 5/10* (2013.01); *G09G 2330/023* (2013.01); *G09G 2354/00* (2013.01); *G09G 2360/145* (2013.01)

(56) References Cited

U.S. PATENT DOCUMENTS

| | | | |
|---|---|---|---|
| 10,735,959 B2 * | 8/2020 | LeCun | G06V 20/46 |
| 10,839,239 B2 * | 11/2020 | Kim | G06V 40/13 |
| 10,936,848 B2 * | 3/2021 | Hama | G06V 40/40 |
| 11,410,456 B2 * | 8/2022 | Lee | G09G 3/3208 |
| 11,423,691 B2 * | 8/2022 | Moon | G06V 40/1394 |
| 11,425,562 B2 * | 8/2022 | LeCun | G06V 10/62 |
| 11,721,127 B2 * | 8/2023 | Kim | G06V 40/1318 382/124 |
| 2016/0253544 A1 * | 9/2016 | Weber | G06V 40/67 382/124 |
| 2017/0132447 A1 * | 5/2017 | Reinhold | H10K 59/60 |
| 2017/0351850 A1 | 12/2017 | Jin et al. | |
| 2017/0364763 A1 | 12/2017 | Jin et al. | |
| 2018/0268232 A1 * | 9/2018 | Kim | G06V 40/40 |
| 2019/0019000 A1 * | 1/2019 | Lee | G02B 5/204 |
| 2019/0110198 A1 * | 4/2019 | LeCun | H04N 19/52 |
| 2019/0171863 A1 * | 6/2019 | Hama | G06V 40/1312 |
| 2019/0369695 A1 | 12/2019 | Wang et al. | |
| 2020/0193138 A1 | 6/2020 | Li et al. | |
| 2020/0304997 A1 * | 9/2020 | LeCun | G06V 40/67 |
| 2020/0327348 A1 * | 10/2020 | Kim | G06V 40/1318 |
| 2021/0042546 A1 * | 2/2021 | Kim | G06V 40/1318 |
| 2021/0073507 A1 * | 3/2021 | Kim | G06V 40/1394 |
| 2021/0142029 A1 * | 5/2021 | Moon | G06V 40/1365 |
| 2021/0217358 A1 * | 7/2021 | Lee | G06V 40/1382 |
| 2021/0397862 A1 | 12/2021 | Lee et al. | |

FOREIGN PATENT DOCUMENTS

| | | |
|---|---|---|
| KR | 1020210055817 | 5/2021 |
| KR | 1020210092365 | 7/2021 |

OTHER PUBLICATIONS

Soon-Gyu Lee et al., "Spoof Detection Scheme for Optical Fingerprint Sensors under the Display", Society For Information Display (SID), vol. 51, Issue 1, pp. 619-621, Aug. 2020.

Office Action dated Mar. 23, 2022 in corresponding U.S. Appl. No. 17/224,421.

* cited by examiner

Layers of skin

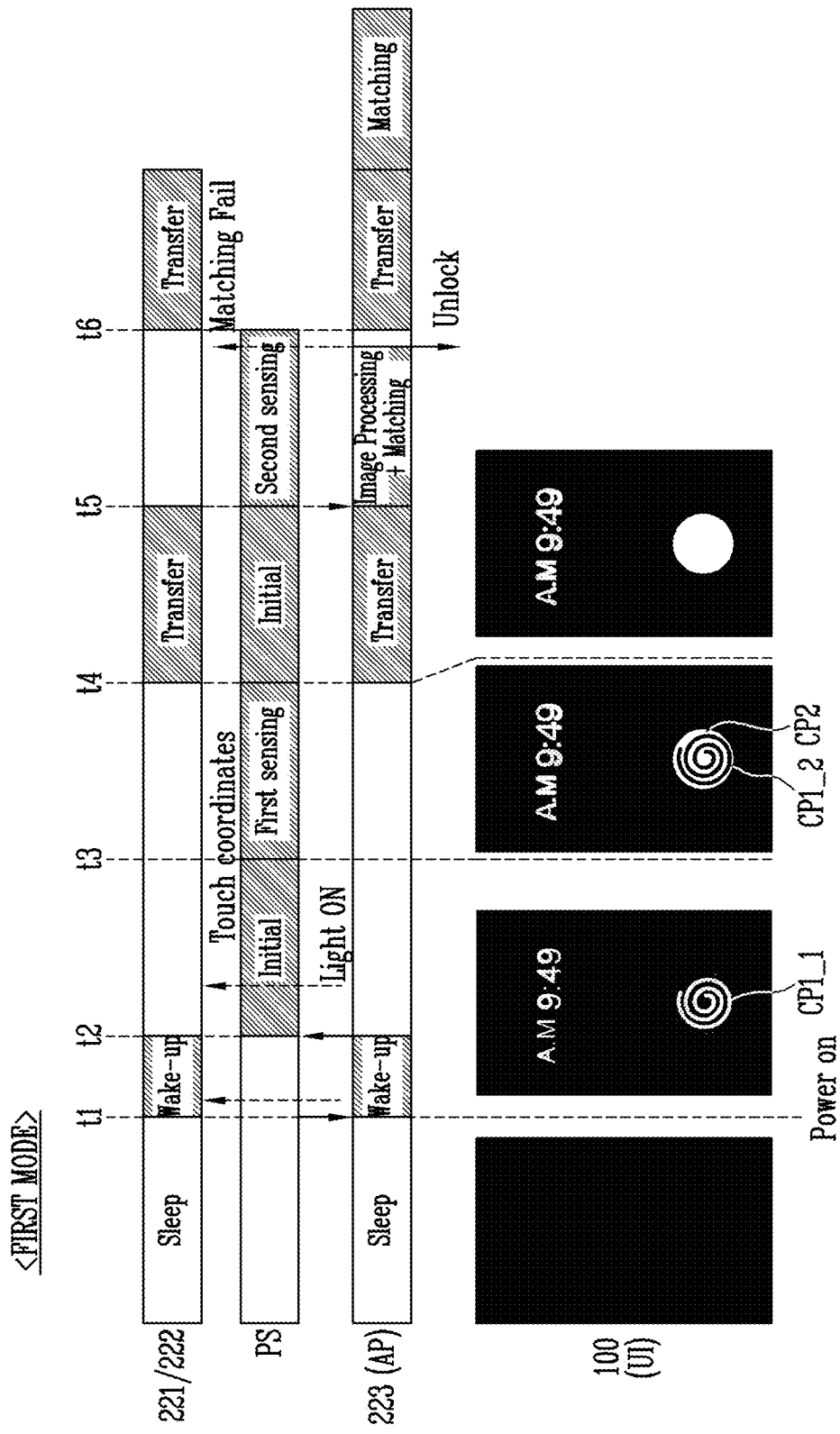

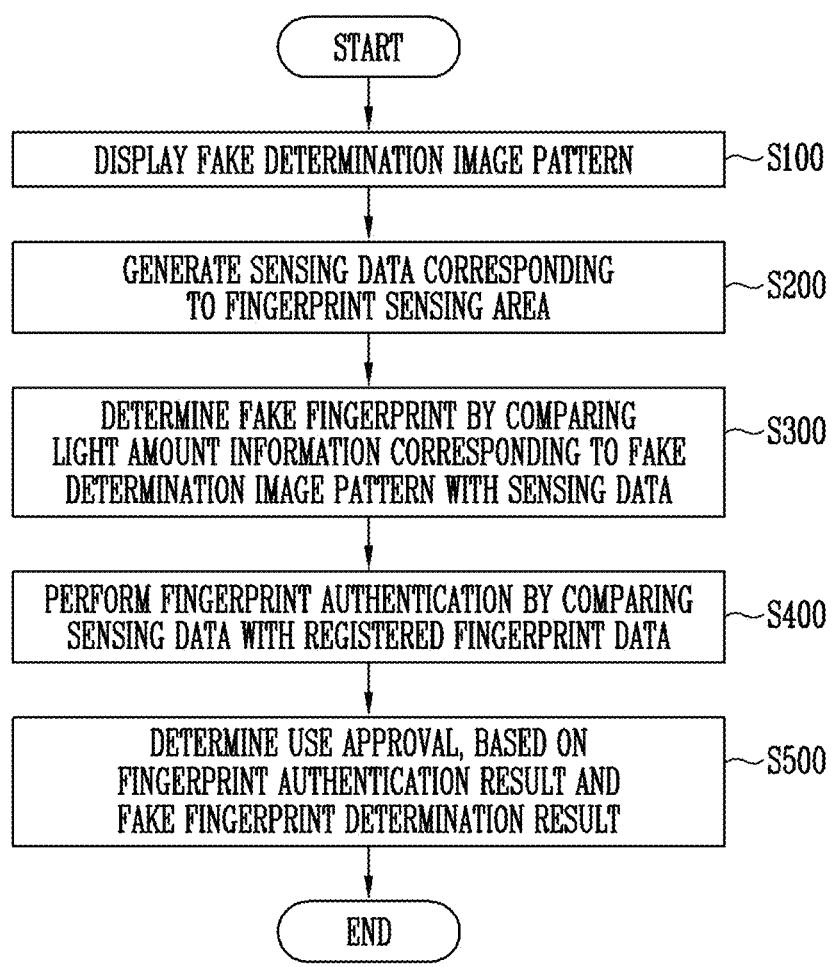

DISPLAY DEVICE AND METHOD FOR DRIVING THE SAME

CROSS-REFERENCE TO RELATED APPLICATIONS

The present U.S. non-provisional patent application is a divisional of co-pending U.S. patent application Ser. No. 17/224,421, titled DISPLAY DEVICE AND METHOD FOR DRIVING THE SAME, and filed on Apr. 7, 2021, which. in turn, claims priority under 35 U.S.C. § 119(a) to Korean patent application 10-2020-0076007 filed on Jun. 22, 2020, in the Korean Intellectual Property Office, the entire disclosures of which are incorporated by reference.

TECHNICAL FIELD

The present disclosure generally relates to a display device and a method for driving the same, and more particularly, to a display device including a photoelectric sensor and a method for driving the same.

RELATED ART

As the use of display devices in smartphones and tablet PCs has increased in many fields, a biometric authentication method using a fingerprint of a user has been widely used. In order to provide a fingerprint sensing function, a fingerprint sensor may be built into a display device or be attached to the top and/or the bottom of the display device. The display device integrated with the fingerprint sensor is referred to as a Fingerprint on Display (FoD).

The FoD may be configured as, for example, a photosensitive type sensor. The photosensitive type FoD may use, as a light source, a light emitting device provided in a pixel, and include a photoelectric sensor array. The photoelectric sensor array may be implemented as, for example, a CMOS Image Sensor (CIS).

Regular personal authentication using such a fingerprint sensor may be used in fields which require security, such as e-commerce using mobile devices, financial transactions, security of electronic devices, and approval of use. Hence, it is not only important to achieve high accuracy of fingerprint recognition, but also to effectively identify a forged or fake fingerprint.

SUMMARY

Embodiments provide a display device for detecting a fake fingerprint by analyzing light which is diffused from skin and then sensed in a non-emission area of a fingerprint sensing area. Embodiments also provide a method for driving the display device.

In accordance with an exemplary embodiment of the present disclosure, there is provided a display device including: a display panel having a plurality of pixels, the display panel displaying a first image including user convenience information; a photoelectric sensor disposed on one surface of the display panel to sense light; and a fingerprint detector configured to determine whether a sensed fingerprint corresponding to a sensing signal supplied from the photoelectric sensor is a fake fingerprint, based on the sensing signal, wherein the first image includes a first color pattern in a fingerprint sensing area of the display panel, and wherein a fake determination image pattern includes the first color pattern and a second color pattern different from the first color pattern.

The user convenience information may include an indication image indicating the fingerprint sensing area. The indication image may include the first color pattern.

A luminance of the first color pattern may be lower than that of the second color pattern.

The fingerprint detector may determine whether the sensed fingerprint is a fake fingerprint by analyzing a light illuminance sensed in a first area in which the first color pattern is displayed.

When the light illuminance sensed in the first area is smaller than a predetermined first reference light illuminance, the fingerprint detector may determine that the sensed fingerprint is a fake fingerprint.

When a light illuminance sensed in a second area in which the second color pattern is displayed is greater than a predetermined second reference light illuminance, the fingerprint detector may determine that the sensed fingerprint is a fake fingerprint.

The fake-determination image pattern may include a first emission area, a first non-emission area, and a second emission area, which are sequentially arranged along a first direction. The first color pattern may include the first non-emission area, and the second color pattern may include the first emission area and the second emission area. A width of the first non-emission area in the first direction may be set such that a light illuminance sensed in the first non-emission area is substantially maximized.

The fake-determination image pattern may further include a second non-emission area and a third emission area, which are sequentially arranged along the first direction with respect to the second emission area. A width of the second non-emission area may be equal to that of the first non-emission area, and a width of the second emission area may be greater than or equal to that of the first non-emission area.

The first image may include a fingerprint pattern imitating a fingerprint. The fingerprint pattern may include the first color pattern.

The fingerprint detector may control the fake-determination image pattern of the fingerprint sensing area of the display panel, which is used for fingerprint sensing, and perform fingerprint authentication on the sensed fingerprint, based on the sensing signal.

The fingerprint detector may include: a pattern controller configured to generate the fake-determination image pattern such that the first color pattern is included in the fingerprint sensing area; a fake fingerprint detector configured to perform fake fingerprint determination by comparing first sensing data corresponding to the second color pattern of the fake-determination image pattern and second sensing data corresponding to the first color pattern of the fake-determination image pattern with light illuminance information set corresponding to the fake-determination image pattern; and a fingerprint analyzer configured to perform the fingerprint authentication by comparing third sensing data corresponding to the fingerprint sensing area except the first color pattern with registered fingerprint data.

The fingerprint detector may include: a pattern controller configured to generate the fake-determination image pattern such that the first color pattern is included in the fingerprint sensing area; a fake fingerprint detector configured to perform fake fingerprint determination by comparing first sensing data corresponding to the second color pattern of the fake-determination image pattern and second sensing data corresponding to the first color pattern of the fake-determination image pattern with light illuminance information set corresponding to the fake-determination image pattern; and a fingerprint analyzer configured to perform the fingerprint authentication by comparing third sensing data corresponding to the fingerprint sensing area with registered fingerprint data.

The fake fingerprint detector may compare a first light pattern as an expected sensing light illuminance of a second area of the fingerprint sensing area, which is included in the light illuminance information, with a light profile of the first sensing data, and compare a second light pattern as an expected sensing light illuminance of a first area of the fingerprint sensing area, which is included in the light illuminance information, with a light profile of the second sensing data. The first color pattern may be displayed in the first area, and the second color pattern may be displayed in the second area.

When an accordance rate between the first sensing data and the first light pattern and an accordance rate between the second sensing data and the second light pattern are equal to or greater than a predetermined threshold value, the fake fingerprint detector may determine that the sensed fingerprint is a real fingerprint.

When at least one of the accordance rate between the first sensing data and the first light pattern and the accordance rate between the second sensing data and the second light pattern is less than a predetermined threshold value, the fake fingerprint detector may determine that the sensed fingerprint is a fake fingerprint.

The fingerprint detector may further include: a memory configured to store the light illuminance information corresponding to the fake-determination image pattern and the registered fingerprint data; and a use approval determiner configured to finally determine whether use of the display device is to be approved, based on a result of the fake fingerprint determination and a result of the fingerprint authentication.

The pattern controller may randomly change the fake-determination image pattern displayed on the display panel in a predetermined period.

The pattern controller may generate the fake-determination image pattern in a first period, and suspend the generation of the fake-determination image pattern in a second period.

The fake fingerprint detector may perform the fake fingerprint determination by using the first sensing data and the second sensing data, which are sensed in the first period. The fingerprint analyzer may perform the fingerprint authentication by using the third sensing data sensed in the second period.

The fingerprint analyzer may compare an accordance rate between a portion corresponding to the second color pattern in the registered fingerprint data and the third sensing data.

In accordance with an exemplary embodiment of the present disclosure, there is provided a method for driving a display device, the method including: displaying a first image including user convenience information through a display panel; generating sensing data corresponding to a fingerprint sensing area by using a photoelectric sensor; and determining whether a sensed fingerprint corresponding to the sensing data is a fake fingerprint by comparing expected sensing light illuminance information based on the first image with sensed light illuminance information of the sensing data, wherein the first image includes a first color pattern in the fingerprint sensing area of the display panel, and wherein a fake-determination image pattern includes the first color pattern and a second color pattern different from the first color pattern.

The user convenience information may include an indication image indicating the fingerprint sensing area. The indication image may include the first color pattern.

A luminance of the first color pattern may be lower than that of the second color pattern.

The determining of whether the sensed fingerprint is the fake fingerprint may include: comparing a first light pattern as an expected sensing light illuminance of a second area of the fingerprint sensing area, which is included in the light illuminance information, with the first sensing data, and comparing a second light pattern as an expected sensing light illuminance of a first area of the fingerprint sensing area, which is included in the light illuminance information, with the second sensing data; and determining that the sensed fingerprint is a real fingerprint, when an accordance rate between the first sensing data and the first light pattern and an accordance rate between the second sensing data and the second light pattern are equal to or greater than a predetermined threshold value. The first color pattern may be displayed in the first area, and the second color pattern may be displayed in the second area.

The method may include determining that the sensed fingerprint is a fake fingerprint, when at least one of the accordance rate between the first sensing data and the first light pattern and the accordance rate between the second sensing data and the second light pattern is less than a predetermined threshold value.

When the display panel is power-on, the first image may be displayed based on the power-on of the display panel.

The display panel may display a general image having a first refresh rate in a first mode, and display a power-saving image having a second refresh rate smaller than the first refresh rate in a second mode. The power-saving image may include the first image.

The method may further include displaying a second image in which light is emitted in the entire fingerprint sensing area, based on a touch input.

The method may further include: performing fingerprint authentication by comparing the sensing data with registered fingerprint data; and determining whether use of display device is to be approved, based on a result of the fingerprint authentication and a result of the fake fingerprint determination.

The performing of the fingerprint authentication may include: comparing an accordance rate between a portion corresponding to the second color pattern in the registered fingerprint data and third sensing data; and determining that the sensed fingerprint accords with the registered fingerprint data, when the accordance rate is a predetermined threshold value or more. The second color pattern may be displayed in the second area.

The determining of whether the use of the display device is to be approved may include approving the use of the display device, when the sensing data and the registered fingerprint data accord with each other, and the sensed fingerprint is a real fingerprint.

The determining of whether the use of the display device is to be approved includes disapproving the use of the display device regardless of whether the sensing data and the registered fingerprint data accord with each other, when it is determined that the sensed fingerprint is a fake fingerprint.

In accordance with still an exemplary embodiment of the present disclosure, there is provided a display device including: a display panel including a plurality of pixels, the display panel displaying a first image including user convenience information; a photoelectric sensor disposed on one surface of the display panel to sense light; and a fingerprint detector configured to determine whether a sensed fingerprint corresponding to a sensing signal supplied from the photoelectric sensor is a fake fingerprint, based on the sensing signal, wherein the first image includes a fake-determination image pattern in a fingerprint sensing area, and the fake-determination image pattern includes a first pattern having a first planar shape.

The user convenience information may include an indication image indicating the fingerprint sensing area. The indication image may include the fake-determination image pattern.

When a touch input occurs in the fingerprint sensing area, a color or luminance of the fake-determination image pattern may be reversed, and the first planar shape of the first pattern need not be changed.

In accordance with still an exemplary embodiment of the present disclosure, a fingerprint sensor includes: a first plurality of display pixels configured to emit an image pattern; a second plurality of photoelectric sensor pixels disposed under said first plurality of display pixels and configured to sense reflected illuminance responsive to said image pattern and provide a sensing signal based on said reflected illuminance; and a fingerprint detector configured to determine whether a sensed fingerprint corresponding to said sensing signal is indicative of a fake fingerprint, based on said image pattern, said sensing signal, and characteristics of at least one real multi-layered fingerprint, wherein said image pattern includes a first color pattern and a second color pattern different from said first color pattern.

The fingerprint sensor may have at least some of said second plurality of photoelectric sensor pixels temporally disposed under said first color pattern configured to substantially sense illuminance reflected by said sensed fingerprint based on luminance of said second color pattern as temporally emitted by at least some of said first plurality of display pixels.

The fingerprint sensor may have said first and second color patterns displayed adjacent to each other at a scale smaller than that of a fingerprint. The fingerprint sensor may have said first color pattern with lower luminance than said second color pattern. The fingerprint sensor may have said first and second color patterns concurrently displayed by the first plurality of display pixels and sensed by the second plurality of photoelectric sensor pixels.

In the display device including the photoelectric sensor and the method for driving the same in accordance with the present disclosure, a fake fingerprint can be detected by analyzing a light illuminance or light pattern in the non-emission area included in the fake-determination image pattern. Accordingly, the accuracy and reliability of fingerprint detection can be optimized without substantially increasing manufacturing costs and/or additional configuration.

BRIEF DESCRIPTION OF THE DRAWINGS

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals may refer to like elements throughout the drawings that follow, in which:

FIGS. 9A to 9D are timing diagrams illustrating an operation of the display device shown in FIG. 1A;

FIG. 11 is a flowchart diagram illustrating a method for driving the display device in accordance with embodiments of the present disclosure;

DETAILED DESCRIPTION

Figure 1A:
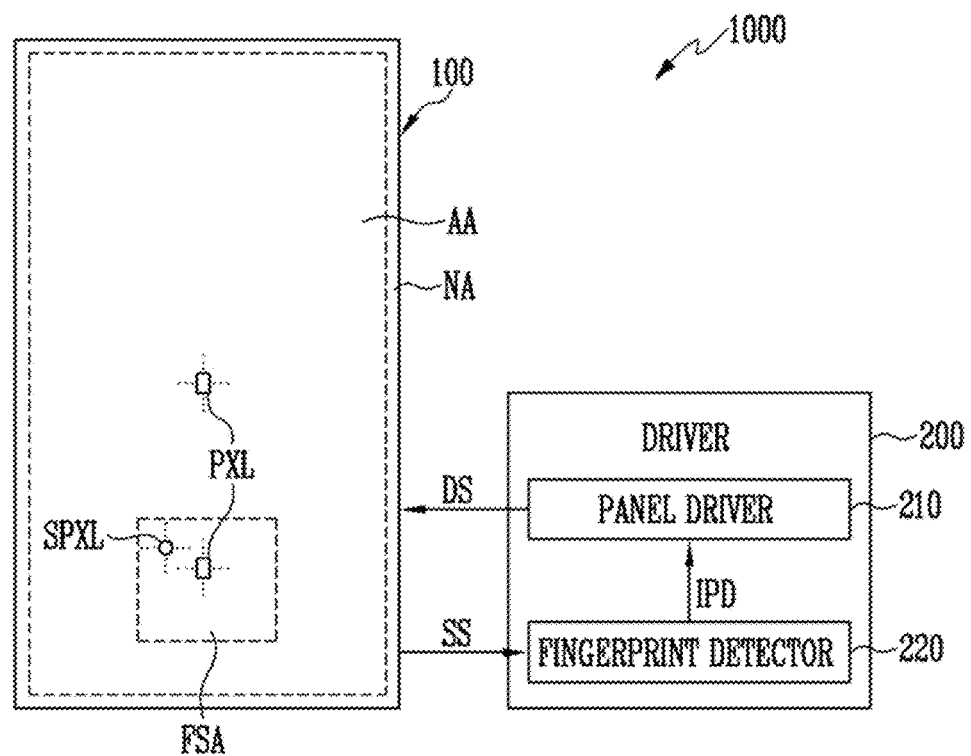
FIG. 1A is a block diagram schematically illustrating a display device in accordance with embodiments of the present disclosure.

Hereinafter, exemplary embodiments may be described in detail with reference to the accompanying drawings so that those skilled in the art may easily practice embodiments the present disclosure. The present disclosure may be implemented in various different forms and is not limited to the exemplary embodiments described in the present specification.

A part or parts irrelevant to the description may be omitted to clearly describe the present disclosure, and the same or similar constituent elements may be designated by the same or similar reference numerals throughout the specification. Therefore, the same or similar reference numerals may be used in different drawings to identify the same or similar elements.

In addition, the sizes and thicknesses of each component illustrated in the drawings are arbitrarily shown for better understanding and ease of description, but the present disclosure is not limited thereto. Thicknesses of several portions and regions may be exaggerated for clear expressions.

Figure 1B:
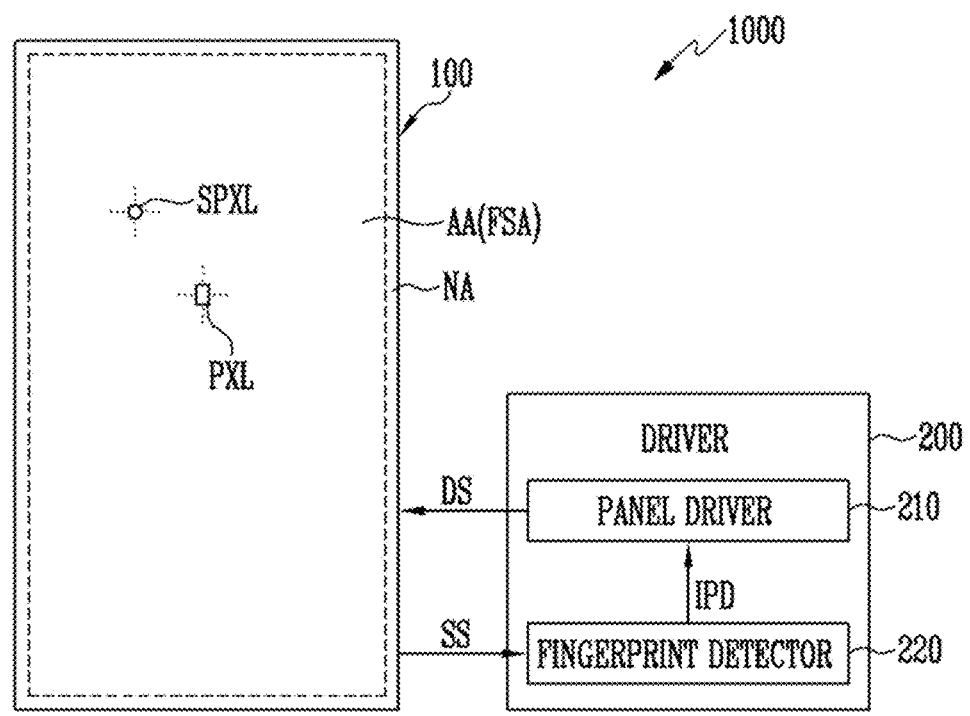
FIG. 1B is a block diagram schematically illustrating another example of the display device shown in FIG. 1A.

FIG. 1A schematically illustrates a display device in accordance with an embodiment of the present disclosure. FIG. 1B schematically illustrates an example of the display device shown in FIG. 1A.

For convenience, although a case where a display panel 100 and a driver 200 are separated from each other is illustrated in FIGS. 1A and 1B, the present disclosure is not limited thereto. More specifically, the whole or a portion of the driver 200 may be integrally implemented with the display panel 100 such as on the display panel 100.

Referring to FIGS. 1A and 1B, the display device 1000 may include the display panel 100 and the driver 200. The driver 200 may include a panel driver 210 and a fingerprint detector 220.

The whole or at least a portion of the display device 1000 may have flexibility, such as in bendable, rollable and/or foldable embodiments.

The display panel 100 includes a display area AA and a non-display area NA. The display area AA is an active area including a plurality of pixels PXL, which may include and/or be referred to as sub-pixels. In various embodiments, each of the pixels PXL may include at least one light emitting device. The display device 1000 drives the pixels PXL, corresponding to image data input from the outside, thereby displaying an image in the display area AA.

In an embodiment, the display area AA may include a fingerprint sensing area FSA. The fingerprint sensing area FSA may include at least some pixels PXL among the plurality of pixels PXL provided in the display area AA.

In an embodiment, as shown in FIG. 1A, at least a portion of the display area AA may be set as the fingerprint sensing area FSA.

In an embodiment, as shown in FIG. 1B, the entire display area AA may be set as the fingerprint sensing area FSA. When fingerprint sensing is performed, a fingerprint sensing operation may be performed on only a portion of the FSA at which a touch of a user is substantially made.

Although an example is shown in which only one fingerprint sensing area FSA is formed in the display area AA, as illustrated in FIG. 1A, the present disclosure is not limited thereto. For example, a plurality of fingerprint sensing areas FSA arranged regularly or irregularly may be formed in the display area AA.

Also, although an example in which the fingerprint sensing area FSA is formed in at least a portion of the display area AA is illustrated in FIG. 1A, the present disclosure is not limited thereto. That is, in various embodiments, the display area AA and the fingerprint sensing area FSA may be provided to partially overlap with each other.

The non-display area NA may be an area disposed at the periphery of the display area AA, and may be referred to as a non-active area. For example, the non-display area NA may include a line area, a pad area, various dummy areas, and the like.

In an embodiment, the display device 1000 may further include a plurality of sensor pixels SPXL provided in the fingerprint sensing area FSA. The sensor pixels SPXL may be configured as a sensor for sensing light. In an embodiment, when light emitted from a light source or pixel PXL provided in the display device 1000 is reflected by a finger of a user, the sensor pixels SPXL may sense the reflected light and output an electrical signal such as a voltage signal corresponding to the reflected light. The electrical signal may be transferred to the driver 200 and/or the fingerprint detector 220, which may be described in greater detail, infra, to be used for fingerprint sensing. Hereinafter, although an example in which the sensor pixels SPXL are used for fingerprint sensing is described in the present disclosure, one or more of the sensor pixels SPXL may be used to perform various functions of a touch sensor, a scanner, or the like.

When the sensor pixels SPXL are arranged in the fingerprint sensing area FSA, the sensor pixels SPXL may overlap with the pixels PXL or be disposed at the periphery of at least some of the pixels PXL. For example, some or all of the sensor pixels SPXL may overlap with the pixels PXL or be disposed between the pixels PXL. In various embodiments, the sensor pixels SPXL and the pixels PXL may have the same size or different sizes. The relative size and arrangement between the sensor pixels SPXL and the pixels PXL are not particularly limited.

When the sensor pixels SPXL are disposed adjacent to the pixels PXL or overlap with the pixels PXL for at least a portion thereof, the sensor pixels SPXL may use, as a light source, the light emitting device provided in each pixel PXL. Therefore, the sensor pixels SPXL along with the light emitting devices provided in the pixels PXL may constitute a photosensitive type fingerprint sensor. When a display device having a built-in fingerprint sensor is configured by using the pixels PXL as light sources, without any external light source, the module thickness of the photosensitive type fingerprint sensor and the display device having the same can be relatively thin.

In various embodiments, the sensor pixels SPXL may be arranged on the other surface, such as a rear surface, facing one surface, such as a front surface, on which an image is displayed between both the surfaces of the display panel 100. However, the present disclosure is not limited thereto.

The driver 200 may drive the display panel 100. For example, the driver 200 may output a data signal DS corresponding to image data to the display panel 100. Also, the driver 200 may output a driving signal for the sensor pixels SPXL, and receive electrical signals, such as a sensing signal SS, received from the sensor pixels SPXL. The driver 200 may detect a fingerprint shape or pattern of a user by using the electrical signals, and/or detect a fake fingerprint.

In various embodiments, the driver 200 may include the panel driver 210 and the fingerprint detector 220. For convenience of description, although a case where the panel driver 210 and the fingerprint detector 220 are separated from each other is illustrated in FIGS. 1A and 1B, the present disclosure is not limited thereto. For example, at least a portion of the fingerprint detector 220 may be integrated with the panel driver 210 or operate in connection with the panel driver 210.

The panel driver 210 may supply a data signal DS corresponding to image data to the pixels PXL while sequentially scanning the pixels PXL of the display area AA. The display panel 100 may display an image corresponding to the image data.

In an embodiment, the panel driver 210 may supply a driving signal DS for fingerprint sensing to the pixels PXL. The driving signal may be provided to allow the pixels PXL to operate as light sources for the sensor pixels SPXL by emitting light of one or more colors. Therefore, the driving signal for fingerprint sensing may be provided to pixels PXL provided in a specific area of the display panel 100, such as but not limited to pixels PXL provided in the fingerprint sensing area FSA.

In an embodiment, image data corresponding to the fingerprint sensing area FSA may be provided or controlled by the fingerprint detector 220. For example, in a fingerprint sensing operation, the fingerprint detector 220 may provide the panel driver 210 with image data corresponding to a fake-determination image pattern IPD to be displayed in the fingerprint sensing area FSA, or provide the panel driver 210 with compensation data and/or a control signal which corresponds to the fake-determination image pattern IPD.

In addition, the driving signal for fingerprint sensing may be provided by the fingerprint detector 220.

The fingerprint detector 220 may transfer, to the sensor pixels SPXL, a driving signal such as a driving voltage for driving the sensor pixels SPXL, and detect a fingerprint of a user based on electrical signals received from the sensor pixels SPXL. For example, the fingerprint detector 220 may perform fingerprint authentication and fake fingerprint determination, including determination of whether the detected fingerprint is a fake fingerprint, based on a sensing signal SS supplied from the sensor pixels SPXL, which may be photoelectric sensors or the like.

In an embodiment, the fingerprint detector 220 may control a fake-determination image pattern of the fingerprint sensing area FSA, and perform fingerprint authentication and fake fingerprint determination, based on a sensing signal SS supplied from a photoelectric sensor including the sensor pixel SPXL, and the like. The fake-determination image pattern may include a first color pattern, such as a relatively non-emission pattern for a non-emission area or first area, and a second color pattern such as an emission pattern for an emission area or second area. A luminance of the first color pattern may be lower than that of the second color pattern. An area in which the first color pattern having a relatively low luminance is displayed may be defined as a non-emission area, and an area in which the second color pattern having a relatively high luminance is displayed may be defined as an emission area. The fingerprint detector 220 may determine whether the sensed fingerprint is a fake fingerprint by analyzing a light illuminance sensed in the non-emission area.

For example, when the light illuminance sensed in the non-emission area is smaller than a predetermined reference light illuminance, the fingerprint detector 220 may determine that the sensed fingerprint is a fake fingerprint. On the contrary, when the light illuminance sensed in the non-emission area is equal to or greater than the predetermined reference light illuminance, the fingerprint detector 220 may determine that the sensed fingerprint is a real biometric fingerprint.

Figure 2A:
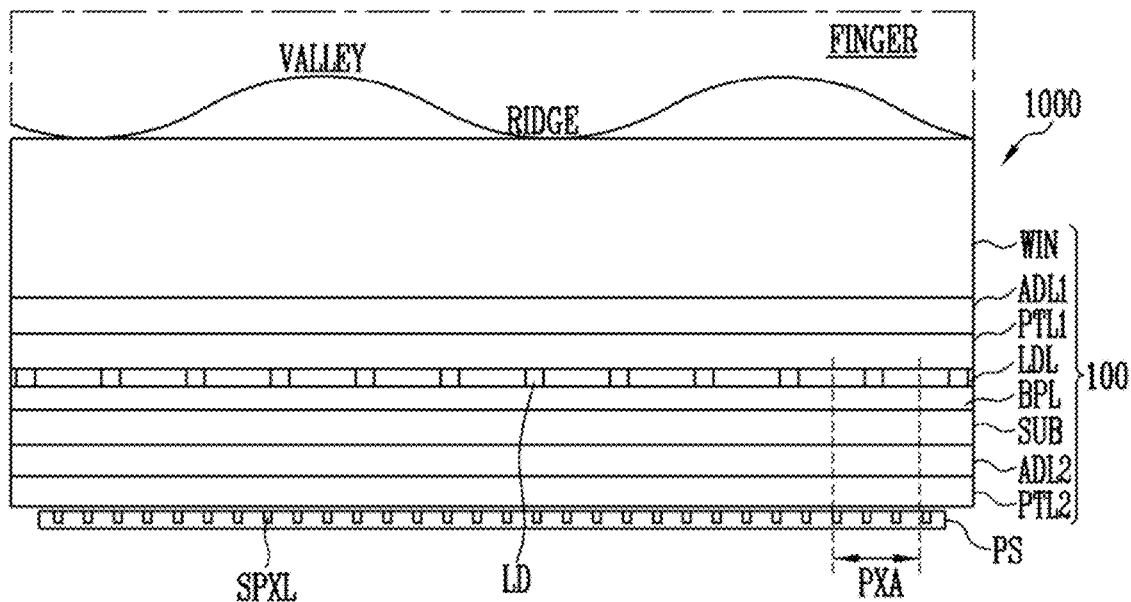
FIG. 2A is a sectional view diagram illustrating an example of the display device shown in FIG. 1A.

FIG. 2A is a sectional view illustrating an example of the display device shown in FIG. 1A or 1B.

Specifically, FIG. 2A illustrates an example of a section in the fingerprint sensing area FSA of the display device 1000 shown in FIGS. 1A and/or 1B.

Referring to FIGS. 1A to 2A, the display device 1000 may include the display panel 100 in the fingerprint sensing area FSA and a photoelectric sensor PS disposed on a surface of the display panel 100. The display device 1000 may also include a substrate SUB, and a circuit element layer BPL, a light emitting device layer LDL, a first protective layer PTL1, a first adhesive layer ADL1, and a window WIN, which are sequentially disposed on a first surface (e.g., an upper surface) of the substrate SUB. The display device 1000 may also include a second adhesive layer ADL2 and a second protective layer PTL2, which are sequentially disposed on a second surface (e.g., a lower surface) of the substrate SUB in the fingerprint sensing area FSA.

The substrate SUB is a base substrate of the display panel 100, and may be a substantially transparent transmissive substrate. The substrate SUB may be a rigid substrate including glass or tempered glass, or a flexible substrate made of plastic or the like. However, the material of the substrate SUB is not limited thereto, and the substrate SUB may be made of various materials.

The circuit element layer BPL may be disposed on the first surface of the substrate SUB, and include at least one conductive layer. For example, the circuit element layer BPL may include a plurality of circuit elements constituting pixel circuits of the pixels PXL and lines for supplying various power sources and signals for driving the pixels PXL. The circuit element layer BPL may include various types of circuit elements such as at least one transistor and at least one capacitor, and a plurality of conductive layers for constituting lines connected to the circuit elements. The circuit element layer BPL may also include at least one insulating layer provided between the plurality of conductive layers.

The light emitting device layer LDL may be disposed on one surface of the circuit element layer BPL. The light emitting device layer LDL may include a plurality of light emitting devices LD connected to the circuit elements and/or the lines of the circuit element layer BPL through contact holes, and the like. In an embodiment, at least one of the plurality of light emitting devices LD may be provided in each pixel PXL. For example, the light emitting device LD may be configured as an organic light emitting diode or an inorganic light emitting diode such as a micro light emitting diode or a quantum dot light emitting diode. Also, the light emitting device LD may be a light emitting device made of a combination of an organic material and an inorganic material. Further, each of the pixels PX includes a single light emitting device LD. Alternatively, in another embodiment, each of the pixels PX may include a plurality of light emitting devices, and the plurality of light emitting devices may be coupled in parallel to each other, be coupled in series to each other, or be coupled in a hybrid series and/or parallel combination to each other.

Each of the pixels PXL may include circuit elements disposed in the circuit element layer BPL and at least one light emitting device LD disposed in the light emitting device layer LDL such as on the top of the circuit element layer BPL.

The first protective layer PTL1 may be disposed on the top of the light emitting device layer LDL to cover the display area AA. The first protective layer PTL1 may include an encapsulating member such as a thin film encapsulation (TFE) layer or an encapsulation substrate, and additionally include a protective film, and the like, in addition to the encapsulating member.

The first adhesive layer ADL1 is disposed between the first protective layer PTL1 and the window WIN to allow the first protective layer PTL1 and the window WIN to be coupled to each other. The first adhesive layer ADL1 may include a transparent adhesive such as an optically clear adhesive (OCA), and include various adhesive materials in addition to the transparent adhesive.

The window WIN is a protective member disposed at a modular uppermost portion of the display device 1000 including the display panel 100, and may be a substantially transparent transmissive substrate. The window WIN may have a multi-layered structure selected from a glass substrate, a plastic film, and a plastic substrate, or the like. The window WIN may include a rigid or flexible substrate, and the material constituting the window WIN is not particularly limited.

In various embodiments, the display device 1000 may further include a polarizing plate, an anti-reflective layer, and/or a touch sensor layer such as a touch electrode layer. For example, the display device 1000 may further include a polarizing plate and/or a touch sensor layer, disposed between the first protective layer PTL1 and the window WIN.

The touch sensor layer may include a plurality of sensing electrodes or sensing cells. The driver 200 described with reference to FIG. 1A may sense whether a touch input occurs and a position or coordinate of the touch input, based on a change in capacitance between the sensing electrodes.

The second protective layer PTL2 may be disposed on the other surface of the substrate SUB. The second protective layer PTL2 may be coupled to the substrate SUB by the second adhesive layer ADL2.

The second adhesive layer ADL2 may allow the substrate SUB and the second protective layer PTL2 to be firmly coupled or attached to each other. The second adhesive layer ADL2 may include a transparent adhesive such as an OCA. The second adhesive layer ADL2 may include a pressure sensitive adhesive (PSA) in which an adhesive material acts when pressure is applied for allowing the second adhesive layer ADL2 to be adhered to an adhesive surface.

The second protective layer PTL2 prevents oxygen and moisture from being introduced thereto from the outside, and may be provided in the form of a single layer or a multi-layer structure. The second protective layer PTL2 may be configured in a film form, and further ensure flexibility of the display panel 100. The second protective layer PTL2 may be coupled to the photoelectric sensor PS through another adhesive layer including a transparent adhesive such as an OCA.

In various embodiments, a selective light blocking film may be further provided on the bottom of the second protective layer PTL2. The selective light blocking film blocks a specific frequency region, such as, for example, ultraviolet light in external light introduced to the display device 1000, to prevent the corresponding light from being incident into sensor pixels SPXL of the photoelectric sensor PS. Although a case where the selective light blocking film is further provided on the bottom of the second protective layer PTL2 is described above, the present disclosure is not limited thereto.

The photoelectric sensor PS is attached to the other surface, such as the rear and/or bottom surface, of the display panel 100 through an adhesive or the like to overlap with at least one area of the display panel 100. For example, the photoelectric sensor PS may be disposed to overlap with the display panel 100 in the fingerprint sensing area FSA. The photoelectric sensor PS may include a plurality of sensor pixels SPXL distributed at a predetermined resolution and/or a predetermined distance.

In an embodiment, an optical system which provides a light path by concentrating light emissions advancing toward the photoelectric sensor PS may be provided on the photoelectric sensor PS. In the optical system, a width of a light transmitting part for guiding light may be determined by considering sensing precision and light conversion efficiency. The concentration ratio of lights incident onto the photoelectric sensor PS may be optimized by the optical system. In some embodiments, the optical system may be formed of optical fiber, silicon, or the like.

The sensor pixels SPXL may have an appropriate number, an appropriate size, and an appropriate arrangement such that a fingerprint image to be identifiable from electrical signals output by the sensing pixels SPXL can be generated. The distance between the sensor pixels SPXL may be densely set such that reflected light reflected from an object to be observed, such as a fingerprint or the like but not limited thereto, can be incident into at least two adjacent sensor pixels SPXL.

The sensor pixels SPXL may output a corresponding electrical signal, such as but not limited to a voltage signal, by sensing external light. Reflected light received at the respective sensor pixels SPXL may have optical properties such as frequencies, wavelengths, sizes, and the like, caused by valleys and ridges of a fingerprint formed on a finger of a user. Therefore, the sensor pixels SPXL may output a sensing signal SS having different electrical characteristics corresponding to the optical properties of the reflected light.

In an embodiment, the sensing signal SS output by the sensor pixels SPXL may be converted into image data by the fingerprint detector 220, and be used for fingerprint identification and fingerprint authentication of the user. In addition, the fingerprint detector 220 may analyze an optical profile for a portion of the sensing signal SS, and detect a fake fingerprint, based on the analyzed optical profile.

Figure 2B:
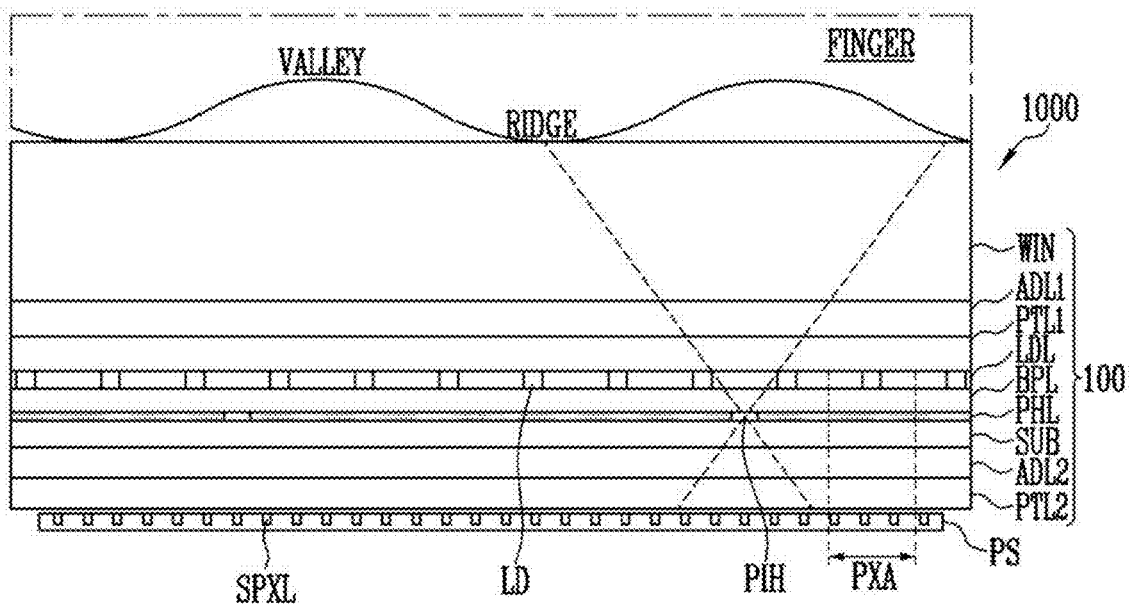
FIG. 2B is a sectional view diagram illustrating another example of the display device shown in FIG. 1A.

FIG. 2B is a sectional view illustrating another example of the display device shown in FIG. 1A. Specifically, FIG. 2B illustrates another example of the section in the fingerprint sensing area FSA of the display device 1000 shown in FIGS. 1A and 1B.

Referring to FIGS. 1A, 2A, and 2B, in another embodiment, the display device 1000 may further include a light blocking layer PHL including pin holes PIH. The light blocking layer PHL may be disposed in the display panel 100 or between the display panel 100 and the sensor pixels SPXL, and may block some of the light directed towards the sensor pixels SPXL. For example, some of the light incident upon the light blocking layer PHL may be blocked, and the remaining light may reach the sensor pixels SPXL under the light blocking layer PHL by passing through the pin holes PIH. The pin holes PIH operate as an optical system, and may be used together with another optical system.

An exemplary embodiment fingerprint sensor may include display pixels PXL configured to emit an image pattern; photoelectric sensor pixels SPXL disposed under the display pixels and configured to sense reflected illuminance responsive to the image pattern and provide a sensing signal SS based on the reflected illuminance; and the fingerprint detector 220 configured to determine whether a sensed fingerprint corresponding to the sensing signal is indicative of a fake fingerprint, based on the image pattern, the sensing signal, and characteristics of at least one real multi-layered fingerprint, where the image pattern may include a first color pattern CP1 and a second color pattern CP2 different from the first color pattern.

Each of the pin holes PIH may mean an optical hole, and provide a type of light passageway. For example, the pin hole PHI may be a light passageway having the smallest size or area among light passageways disposed when layers of the display device 1000 overlap with each other, on a path along which reflected light passes through the display panel 100 in an oblique direction or vertical direction and then is incident upon the sensor pixels SPXL.

The pin holes PIH may have a predetermined width, such as, for example, a width w in a range of about 5 μm to about 20 μm. In this manner, the width of an optical opening area, which is to be secured in each layer of the display device 1000, may gradually increase as becoming more distant from the light blocking layer PHL, such as where approaching the top and bottom of the light blocking layer PHL.

The width or diameter of the pin holes PIH may be set to about ten times longer than the wavelength of reflected light, such as about 4 μm or 5 μm or more so as to prevent diffraction of light. The width of the pin holes PIH may also be set to a size large enough to prevent image blur and to more clearly sense the shape of a fingerprint. For example, the width of the pin holes PIH may be set to about 15 μm or less. However, the present disclosure is not limited thereto, and the width of the pin holes PIH may be changed depending on the wavelength band or bands of reflected light and/or the thickness of a module for each layer.

Only light reflected from the putative fingerprint and passing through the pin holes PIH may reach the sensor pixels SPXL. A phase of light reflected from a fingerprint by the pin hole PIH having a relatively narrow width and a phase of an image formed in the photoelectric sensor PS may have a difference of 180 degrees, for example.

The sensor pixels SPXL may output a sensing signal SS, such as a voltage signal corresponding with reflected light received thereto.

However, this is merely illustrative, and the configuration, arrangement, driving method, and the like of a photoelectric sensor for detecting light reflected from a fingerprint are not limited to the photoelectric sensor PS shown in FIG. 2A or 2B.

Figure 3A:
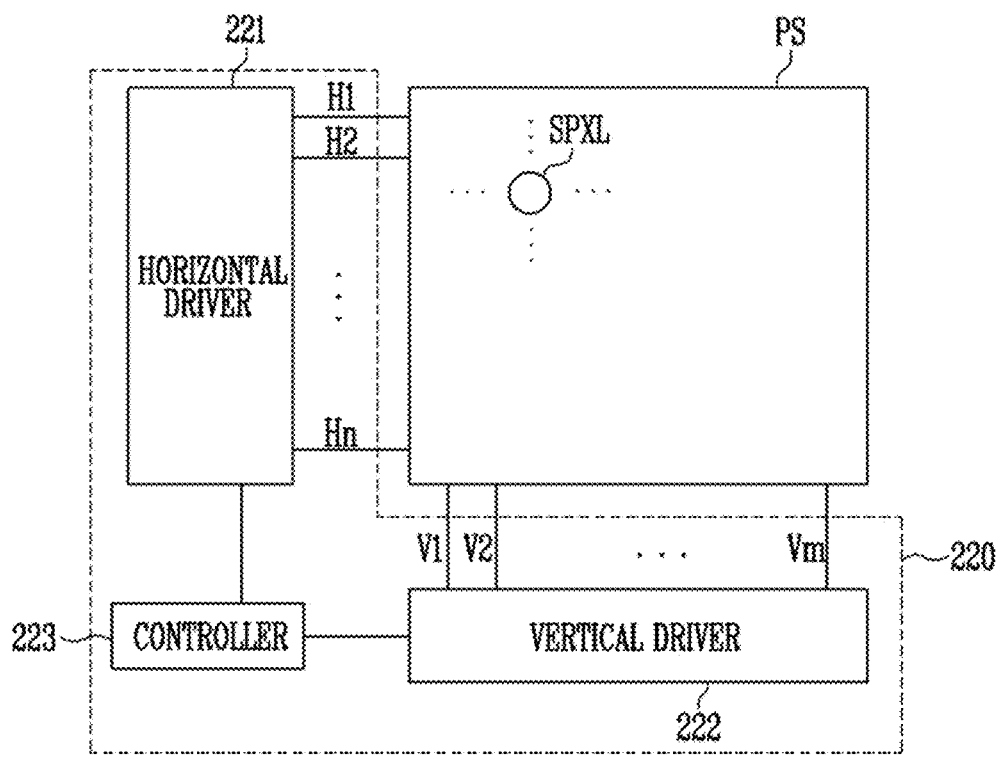
FIG. 3A is a block diagram illustrating an example of a configuration of a photoelectric sensor and a fingerprint detector, which are included in the display device shown in FIG. 1A.

FIG. 3A illustrates an example of a configuration of the photoelectric sensor and the fingerprint detector, which may be included in the display device shown in FIG. 1A.

Referring to FIGS. 1A and 3A, the photoelectric sensor PS may include an array of sensor pixels SPXL. In an embodiment, the sensor pixels SPXL may be arranged in a two-dimensional array, but the present disclosure is not limited thereto. Each of the sensor pixels SPXL may include a photoelectric device which converts incident light into electric charges according to an illuminance of the light.

The fingerprint detector 220 may include a horizontal driver 221, a vertical driver 222, and a controller 223.

The horizontal driver 221 may be connected to the sensor pixels SPXL through driving lines H1 to Hn. The horizontal driver 221 may be configured as a shift register, an address decoder, or the like. In various embodiments, the horizontal driver 221 may apply a driving signal to drive selected sensor pixels SPXL among the sensor pixels SPXL. For example, the horizontal driver 221 may apply a driving signal to a sensor pixel row.

Sensor pixels SPXL selected and driven by the horizontal driver 221 sense light by using photoelectric devices provided therein, and output an electrical signal, such as sensing signal SS, which may be a voltage signal corresponding to the sensed light. The output electrical signal may be an analog signal.

The vertical driver 222 may be connected to the sensor pixels SPXL through signal lines V1 to Vm. The vertical driver 222 may perform processing on a signal output from the sensor pixels SPXL.

For example, the vertical driver 222 may perform Correlated Double Sampling (CDS) processing for removing noise from an electrical signal received thereto. The vertical driver 222 may also convert an analog signal received from the sensor pixel SPXL into a digital signal. In an embodiment, an analog-digital converter may be provided for each sensor pixel column, to process in parallel analog signals received from the sensor pixel columns.

The controller 223 may control the horizontal driver 221 and the vertical driver 222.

In an embodiment, the controller 223 may generate image data corresponding to the sensing signal SS received from the vertical driver 222, and, perform processing on the generated image data. In an embodiment, the controller 223 may detect a fingerprint from the processed image data, or authenticate the detected fingerprint and/or transmit the detected fingerprint to the outside. For example, the controller 223 may include at least some of components included in a fingerprint detector 220 shown in FIGS. 6A and 6B, or perform functions of at least some of the components.

However, this is merely illustrative, and generation of image data and fingerprint detection need not be performed by the controller 223 but may be performed by an external host processor, or the like.

Figure 3B:
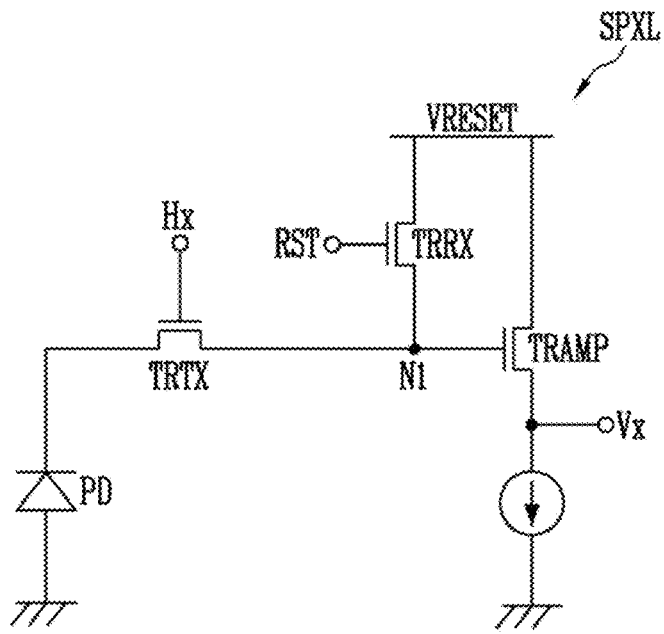
FIG. 3B is a circuit diagram illustrating an example of a sensor pixel included in the photoelectric sensor shown in FIG. 3A.

FIG. 3B is a circuit example of the sensor pixel included in the photoelectric sensor shown in FIG. 3A.

In FIG. 3B, a sensor pixel SPXL disposed on an $x^{th}$ sensor pixel row and an $y^{th}$ sensor pixel column is illustrated, where x and y are positive integers.

Referring to FIGS. 3A and 3B, the sensor pixel SPXL includes a photoelectric diode PD as a non-limiting example of the photoelectric device, a transmission transistor TRTX, a reset transistor TRRX, and an amplification transistor TRAMP. In FIG. 3B, an example in which the transistors are implemented as N-type transistors is illustrated, without limitation thereto. However, in various embodiments, at least some of the transistors may be implemented as P-type transistors, and corresponding to this, the circuit structure of the sensor pixel SPXL may be variously modified.

An anode electrode of the photoelectric diode PD may be grounded. The transmission transistor TRTX is connected between a cathode electrode of the photoelectric diode PD and a first node N1, and a gate electrode of the transmission transistor TRTX is connected to the horizontal driver 221. The transmission transistor TRTX is turned on when a driving signal is applied through a driving line Hx, to operate as a transmission gate unit that transfers electric charges converted from light in the photoelectric diode PD to the first node N1 as an electric charge voltage converter.

The reset transistor TRRX is connected between a reset power source $V_{RESET}$ and the first node N1, and may receive a reset signal applied through a gate electrode connected to a reset line RST. The reset transistor TRRX is turned on when the reset signal is applied, to reset a voltage of the first node N1 as a voltage of the reset power source $V_{RESET}$.

The amplification transistor TRAMP is connected between the reset power source $V_{RESET}$ and a signal line Vx, and a gate electrode of the amplification transistor TRAMP is connected to the first node N1. The amplification transistor TRAMP operates as an amplifier that outputs a signal, corresponding to the voltage of the first node N1, to the signal line Vx.

In various embodiments, the structure of the sensor pixel SPXL is not limited to that of the three transistors described above, and the sensor pixel SPXL may include, for example, four or more transistors or two or less transistors.

Figure 4:
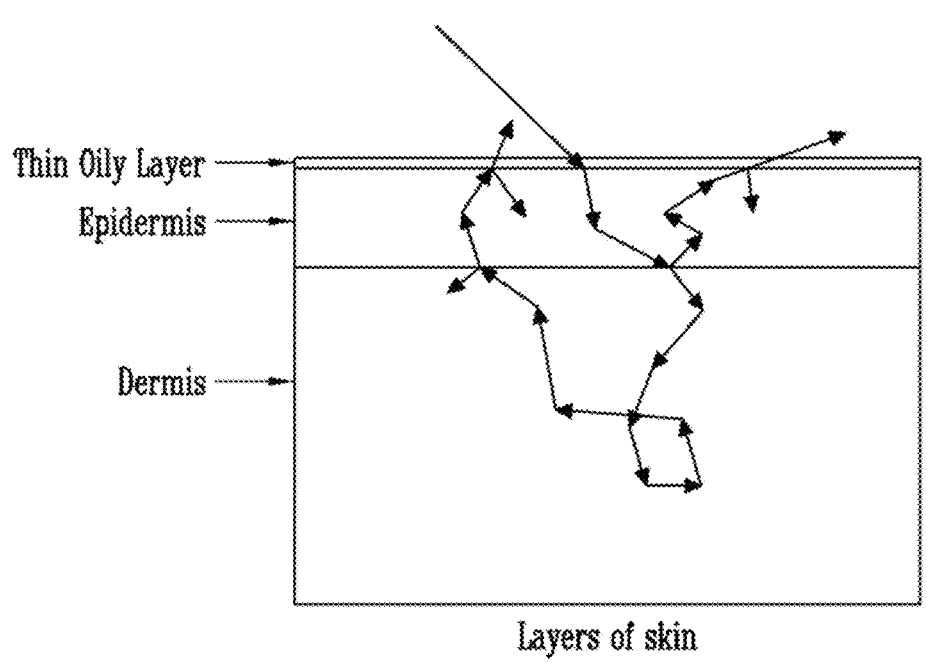
FIG. 4 is a schematic diagram illustrating an example of a path of light incident into skin of a user.

FIG. 4 illustrates an example of a path of light incident upon skin of a user's finger.

Referring to FIG. 4, at least a portion of light irradiated onto skin of a person for the purpose of fingerprint sensing may be absorbed into the skin.

Skin of a finger for fingerprint sensing includes an oily layer, an epidermis, and a dermis.

The oily layer, the epidermis, and the dermis have different light absorption rates and different refractive indices. Therefore, at least a portion of light irradiated onto the skin is diffused and refracted in the oily layer, the epidermis, and the dermis, and then radiated to the outside of the skin. That is, when light emitted from a light source or pixel is reflected by a user's finger, an incident angle of light incident upon the finger and a resultant angle of light, such as of the light reflected from the finger, are different from each other. In addition, the reflected light from the finger may be spread in multiple directions due to reflection, absorption, and refraction characteristics of each of the oily layer, the epidermis, and the dermis.

The fingerprint detector 220 may use at least some of the photoelectric sensor pixels SPXL temporally disposed under a first color pattern CP1 that are configured to substantially sense illuminance reflected by a sensed fingerprint based on luminance of a second color pattern CP2 as temporally emitted by at least some of the display pixels PXL.

For example, when the finger is in contact with a fingerprint sensing area including a non-emission area with a predetermined size, light of a predetermined pattern may be detected even in the non-emission area by light which is passed into the skin and then redirected to the outside of the skin.

A fake fingerprint may be one obtained by printing a fingerprint image on a transparent film or paper, or may be generally made as a fingerprint shape by putting a material such as silicon, rubber, gelatin, or glue for wood in a fingerprint mold and then hardening the material. Since the fake fingerprint has optical properties different from those of the skin, the fake fingerprint may be detected as disclosed herein based on such optical properties.

In particular, a two-dimensional (2D) fake fingerprint using a film, a fake fingerprint manufactured by using a single material, and the like have optical properties different from those of the finger, and hence differences exist in terms of light illuminance, light pattern, and the like of reflected light detected. For example, a fingerprint detector, such as 220 shown in FIG. 1, may detect a fake fingerprint by analyzing a difference between a degree of diffusion of light reflected from the fake fingerprint and a degree of diffusion of light reflected from the user's finger.

Figure 5A:
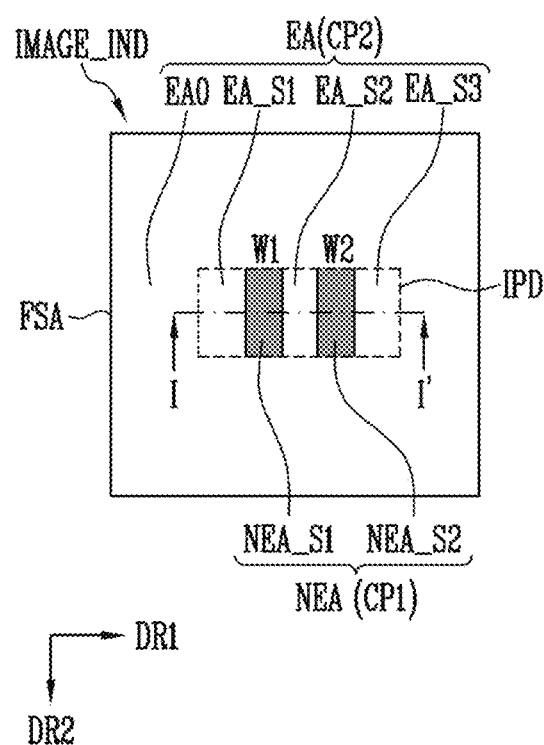
FIG. 5A is a schematic diagram illustrating light detected from a fingerprint sensing area of a display panel of the display device shown in FIG. 1A.

FIG. 5A illustrates light detected from the fingerprint sensing area of the display panel of the display device shown in FIG. 1A.

Referring to FIGS. 1A and 5A, the fingerprint sensing area FSA may be included in the display area AA of the display panel 100.

In an embodiment, an indication image IMAGE_IND indicating the fingerprint sensing area FSA may be displayed in the fingerprint sensing area FSA. The indication image IMAGE_IND may include a fake-determination image pattern IPD for determination of a fake fingerprint. The indication image IMAGE_IND may be included in a user convenience information which is an image for requesting a user to input a fingerprint, and the user convenience information may include at least a part (e.g., a color pattern, a planar shape) of the fake-determination image pattern IPD.

The fake-determination image pattern IPD may include a first color pattern CP1 and a second color pattern CP2. A portion at which the first color pattern CP1 is displayed may be defined as a low-luminance area or a non-emission area NEA, and a portion at which the second color pattern CP2 is displayed may be defined as an emission area EA. For example, first and second color patterns CP1 and CP2 may be displayed adjacent to each other at a scale smaller than that of a fingerprint.

Pixels PXL corresponding to the non-emission area NEA need not emit light or may emit light having a luminance relatively lower than that of the emission area EA. When each pixel PXL includes sub-pixels emitting lights of different colors, a color in the emission area EA may be different from that in the non-emission area NEA according to luminance of the sub-pixels. For convenience of description, a case where the pixels PXL do not emit light in the non-emission area EA is described so as to clearly distinguish the emission area EA and the non-emission area NEA from each other, without limitation thereto. Light may be emitted from pixels PXL corresponding to the emission area EA. The light emitted from the pixels PXL corresponding to the emission area EA may be reflected from a target object, such as but not limited to a real fingerprint or a fake fingerprint, and photoelectric sensors or sensor pixels SPXL may detect the light reflected from the fingerprint, for example.

In an embodiment, the fake-determination image pattern IPD may include a first sub-emission area or first emission area EA_S1, a first sub-non-emission area or first non-emission area NEA_S1, and a second sub-emission area or second emission area EA_S2, which are sequentially arranged along a first direction DR1. In some embodiments, the fake-determination image pattern IPD may further include a second sub-non-emission or non-emission area NEA_S2 and a third sub-emission or emission area EA_S3, which are sequentially arranged along the first direction DR1 with respect to the second sub-emission area EA_S2. The first sub-emission area EA_S1, the second sub-emission area EA_S2, and the third sub-emission area EA_S3 may be included in the emission area EA; and the first sub-non-emission area NEA_S1 and the second sub-non-emission area NEA_S2 may be included in the non-emission area NEA.

The first sub-emission area EA_S1, the second sub-emission area EA_S2, the third sub-emission area EA_S3, the first sub-non-emission area NEA_S1, and the second sub-non-emission area NEA_S2 may extend in a second direction DR2 intersecting the first direction DR1, without limitation thereto. In FIG. 5A, the first sub-emission area EA_S1, the second sub-emission area EA_S2, and the third sub-emission area EA_S3 are connected to each other through a reference emission area EA0, such as an emission area at the outside of the fake-determination image pattern IPD. The first sub-non-emission area NEA_S1 and the second sub-non-emission area NEA_S2 are separated from each other along the first direction DR1. However, this is merely illustrative, and the emission area EA and the non-emission area NEA are not limited thereto.

Figure 7A:
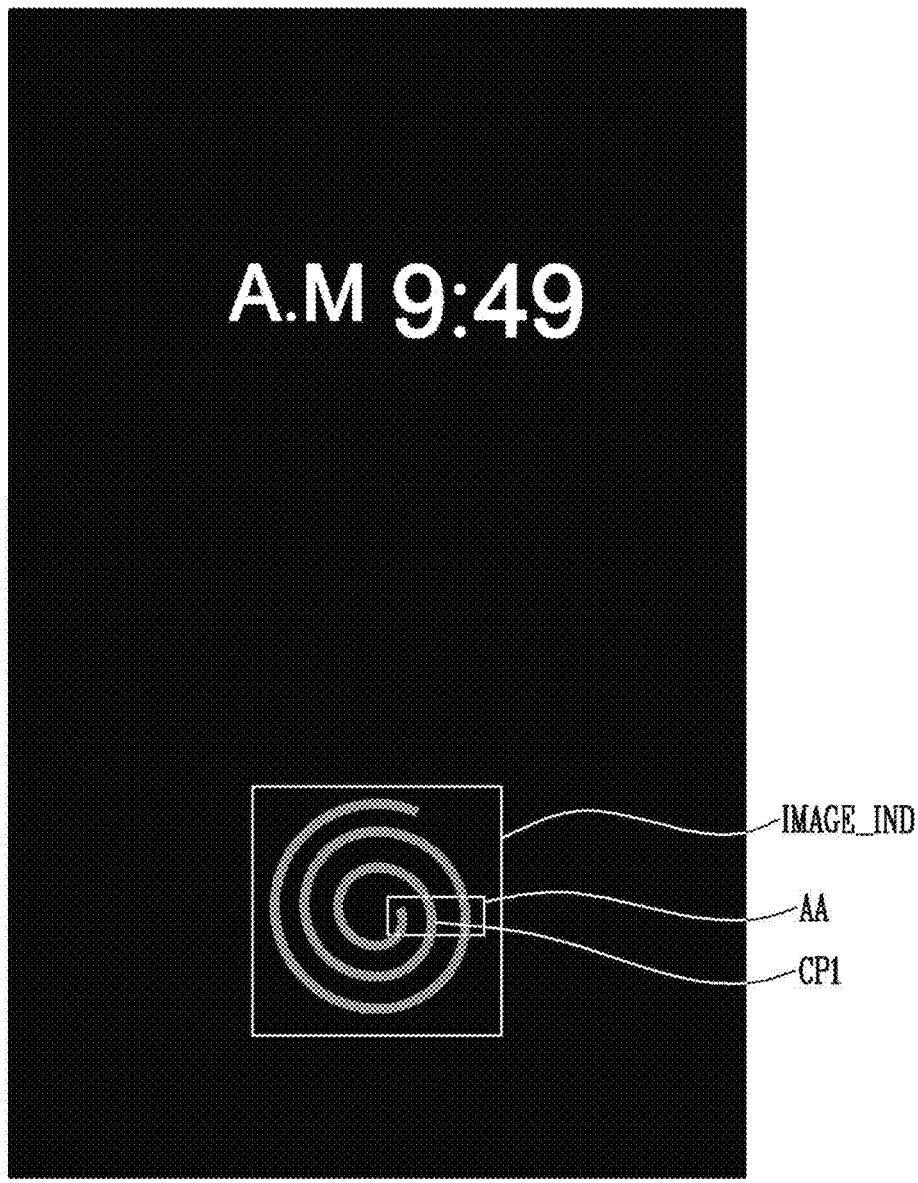
FIG. 7A is a schematic diagram illustrating an example of an image displayed on the display panel of the display device shown in FIG. 1A.

Although described infra with reference to FIG. 7A, for example, the first sub-emission area EA_S1, the second sub-emission area EA_S2, and the third sub-emission area EA_S3 may be separated from each other. In another example, the first sub-non-emission area NEA_S1 and the second sub-non-emission area NEA_S2 may be connected to each other.

In some embodiments, widths or sizes of each of the first sub-non-emission area NEA_S1 and the second sub-non-emission area NEA_S2 in the first direction DR1 may be set such that a light illuminance sensed in each of the first sub-non-emission area NEA_S1 and the second sub-non-emission area NEA_S2 is substantially maximized. Similarly, a width of the second sub-emission area EA_S2 in the first direction DR1 may be set such that a light illuminance sensed in the second sub-emission area EA_S2 is substantially minimized. The width of each of the first sub-non-emission area NEA_S1 and the second sub-non-emission area NEA_S2 in the first direction DR1 and the width of the second sub-emission area EA_S2 in the first direction DR1 may be described infra with reference to FIG. 8.

An exemplary embodiment display device 1000 may include a display panel 100 having pixels PXL configured to display a first image including user convenience information and a fake-determination image pattern; a photoelectric sensor SPXL, disposed on the display panel, and configured to sense reflected light responsive to the fake-determination image pattern and provide a sensing signal SS based on the reflected light; and a fingerprint detector 220 configured to determine whether a sensed fingerprint corresponding to the sensing signal is indicative of a fake fingerprint, based on the fake-determination image pattern and the sensing signal, where the user convenience information includes a first color pattern, and where CP1 the fake-determination image pattern includes the first color pattern and a second color pattern CP2 different from the first color pattern.

Figure 5B:
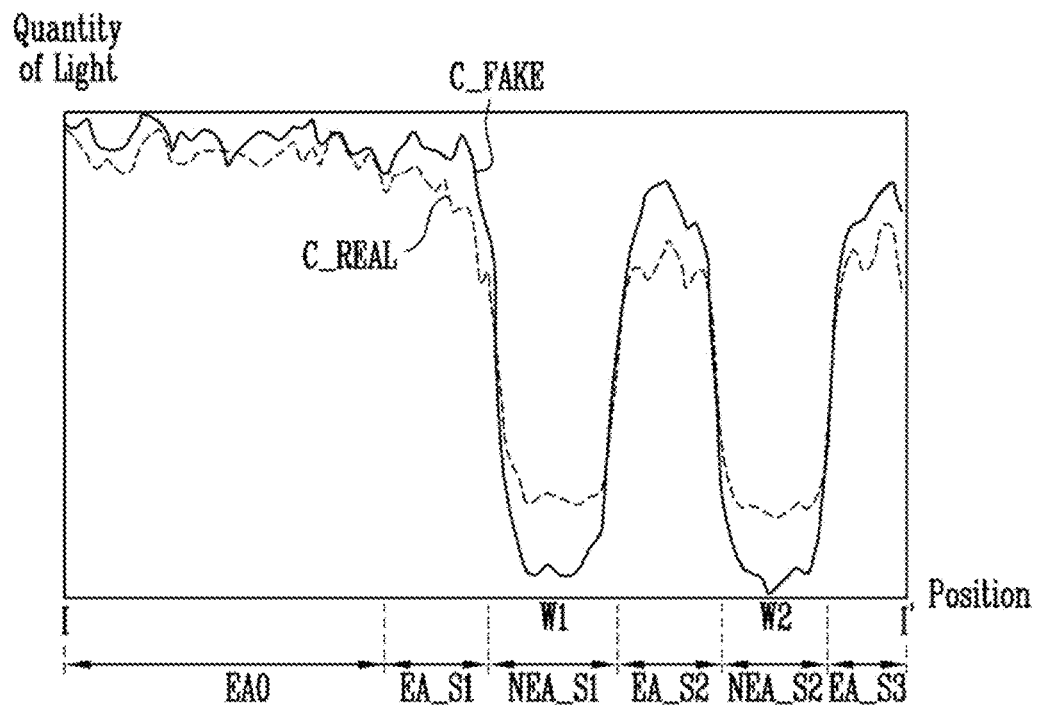
FIG. 5B is a graphical diagram illustrating light illuminance information sensed corresponding to portion I-I' shown in FIG. 5A.
Figure 5C:
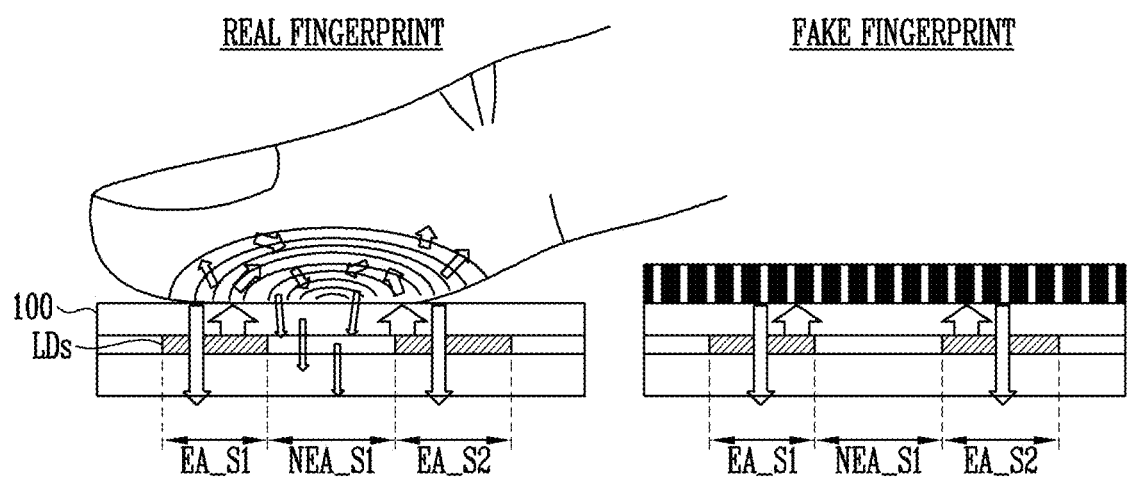
FIG. 5C is a schematic diagram illustrating properties of lights reflected by a real fingerprint and a fake fingerprint according to a fake-determination image pattern shown in FIG. 5A.

FIG. 5B illustrates sensed light amount or illuminance information corresponding to the portion I-I' shown in FIG. 5A. FIG. 5C illustrates properties of light reflected by a real fingerprint and a fake fingerprint, respectively, in response to the fake-determination image pattern shown in FIG. 5A.

Referring to FIGS. 5A and 5B, a first graph C_REAL represents light illuminance information of sensing image data such as a sensing signal SS responsive to a real fingerprint, and a second graph C_FAKE represents light illuminance information of sensing image data responsive to a fake fingerprint. The x-axis of FIG. 5B represents pixel position, and the y-axis represents light illuminance included in the sensing image data, where C_REAL and C_FAKE are each represented on a same relative scale with respect to the maximum light illuminance in the sensing image data.

As shown in FIG. 5B, in the first sub-non-emission area NEA_S1 and the second sub-non-emission area NEA_S2, a light illuminance, which is on average a first reference value or more, may be detected from the real fingerprint. This is because, as shown in FIG. 5C, light emitted from the first sub-emission area EA_S1 and the second sub-emission area EA_S2 is refracted and diffused by a skin structure of the real fingerprint, and the diffused light is incident upon the first sub-non-emission area NEA_S1.

Since light is diffused by the real fingerprint, a reflected luminance may be relatively gently changed from the first sub-emission area EA_S1, such as in or including a boundary area between the emission area and the non-emission area.

In the first sub-non-emission area NEA_S1 and the second sub-non-emission area NEA_S2, light intensities, which are on average smaller than the first reference value, may be detected from the fake fingerprint. This is because, as shown in FIG. 5C, it is less likely that reflected light will be diffused since a majority of light reflected by the fake fingerprint using a film or the like is caused by surface reflection.

Since light is hardly diffused by the fake fingerprint, the luminance may be rapidly changed in the first sub-emission area EA_S1, such as in or including the boundary area between the emission area and the non-emission area.

The fake fingerprint can be detected by analyzing a light illuminance in the non-emission area NEA, a light illuminance in the emission area EA, and a difference between the light intensities due to a difference in optical properties, such as a light absorptivity, a light reflexibility, a refractive index, a scattering rate, and/or the like, between the real fingerprint and the fake fingerprint.

Figure 6A:
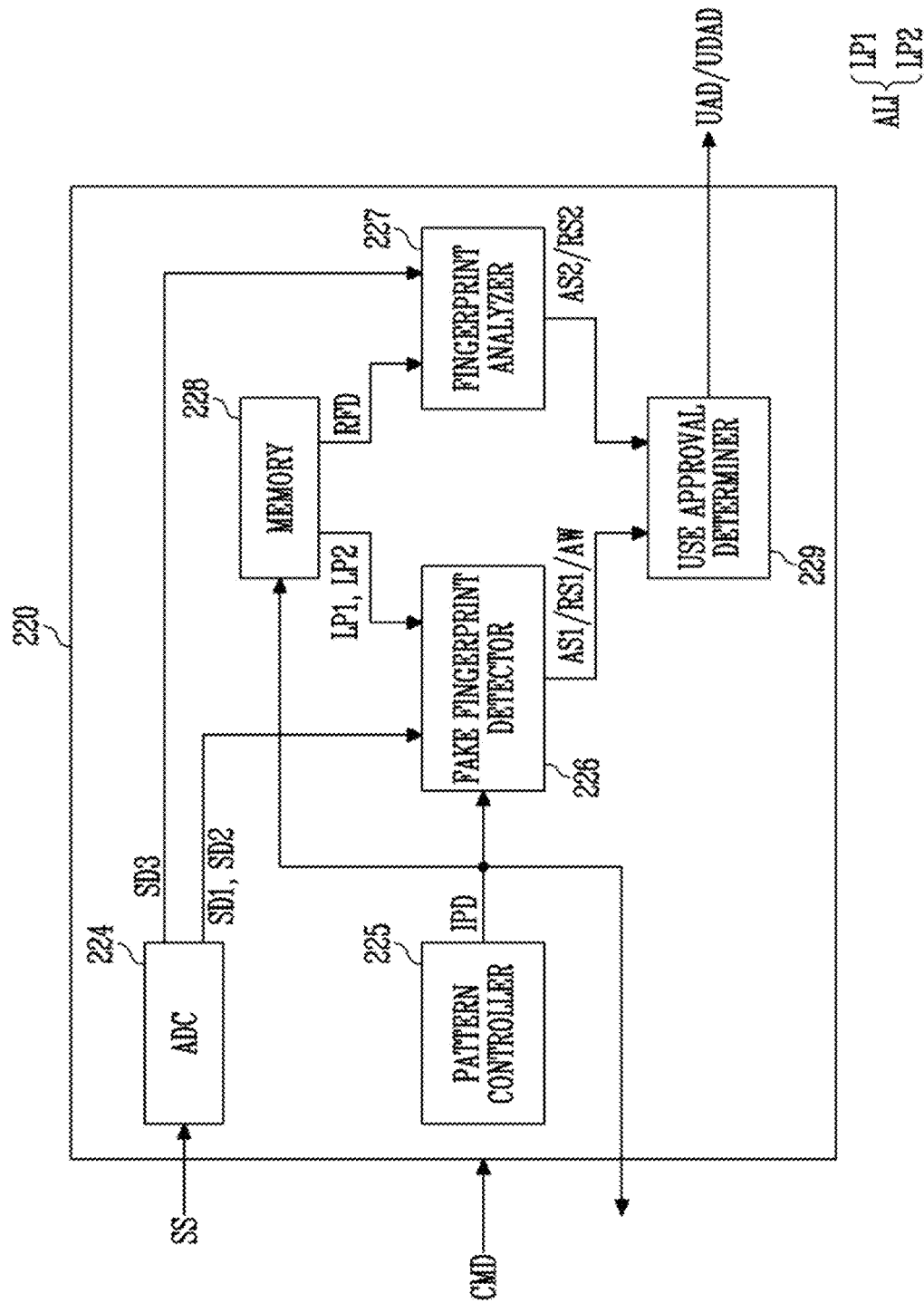
FIGS. 6A and 6B are block diagrams illustrating an example of the fingerprint detector included in the display device shown in FIG. 1A.
Figure 6B:
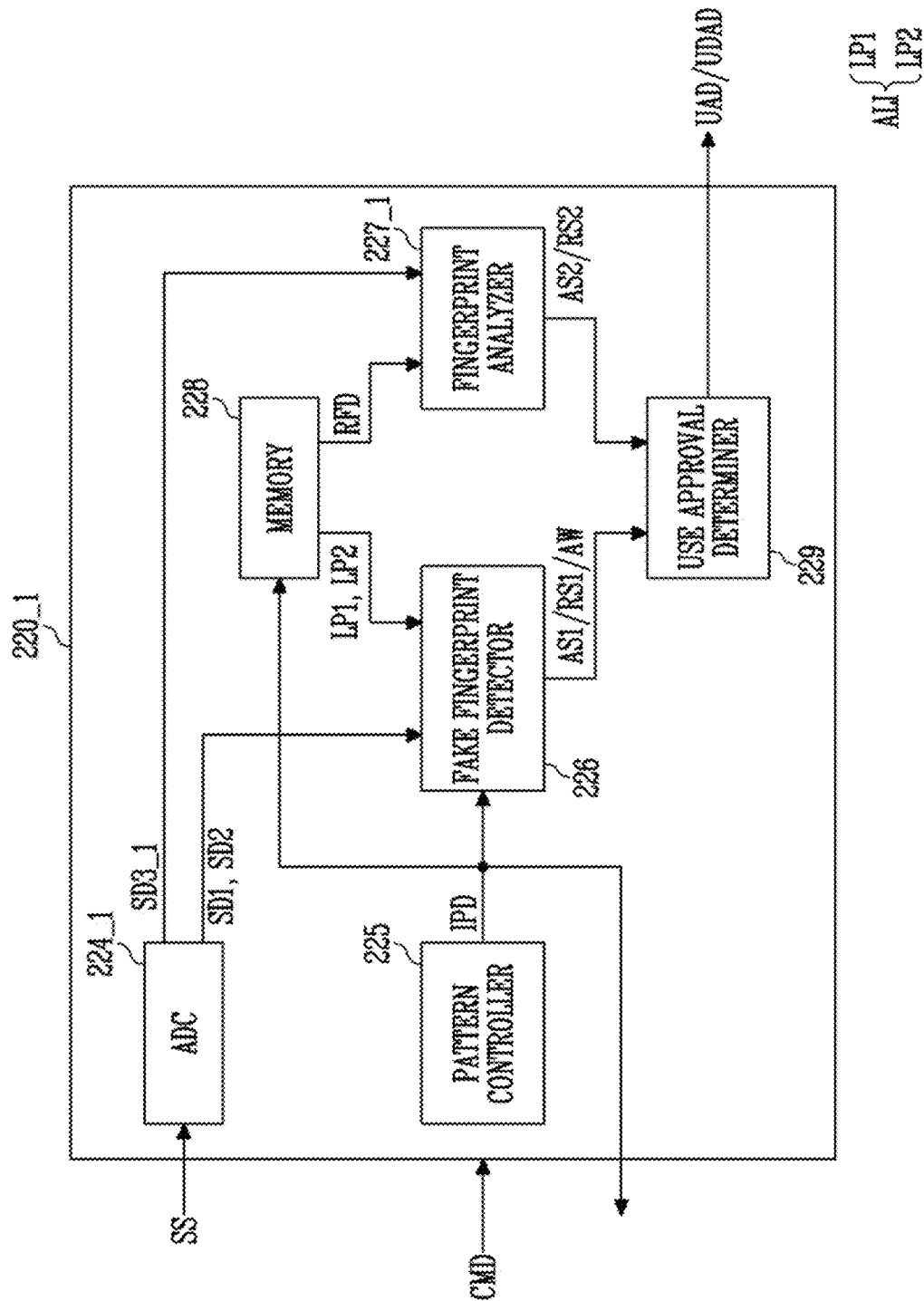

FIGS. 6A and 6B illustrate an example of the fingerprint detector included in the display device shown in FIG. 1A.

Referring to FIGS. 1A, 6A, and 6B, the fingerprint detector 220 may include a pattern controller 225, a fake fingerprint detector 226, and a fingerprint analyzer 227.

In an embodiment, the fingerprint detector 220 may further include a memory 228 and a use approval determiner 229.

The fingerprint detector 220 may perform fingerprint authentication and/or fake fingerprint determination in response to a fingerprint sensing command CMD provided from the outside.

In an embodiment, the fingerprint detector 220 may further include an analog-to-digital converter (ADC) 224 described with reference to FIG. 3A. The ADC 224 may convert a sensing signal SS in an analog form into sensing data SD1, SD2, and SD3 in a digital form.

The pattern controller 225 may generate a fake-determination image pattern IPD so as to perform fake fingerprint determination. The fake-determination image pattern IPD may include a first color pattern for a non-emission area and a second color pattern for an emission area. The size, shape, number, and the like of the first color pattern for the non-emission area included in the fake-determination image pattern IPD may be randomly determined. Similarly, the size, shape, number, and the like of the second color pattern for the emission area as included in the fake-determination image pattern IPD may be randomly determined. Alternatively, the pattern controller 225 may randomly or otherwise select and output one of various image patterns stored in the memory 228.

In an embodiment, the panel driver 210 may generate a data signal corresponding to the fake-determination image pattern IPD and supply the generated data signal to the display panel 100.

The fake fingerprint detector 226 may receive first sensing data SD1 corresponding to the second color pattern for the emission area of the fake-determination image pattern IPD and second sensing data SD2 corresponding to the first color pattern for the non-emission area of the fake-determination image pattern IPD. The fake fingerprint detector 226 may further receive, from the memory 228, light illuminance information ALI set corresponding to the fake-determination image pattern IPD. For example, light illuminance information ALI on each of various fake-determination image patterns IPD may be recorded in the memory 228.

In an embodiment, the light illuminance information ALI may include a first expected light pattern LP1 as an expected sensing light illuminance of the second color pattern for the emission area of the fake-determination image pattern IPD, and a second expected light pattern LP2 as an expected sensing light illuminance of the first color pattern for the non-emission area of the fake-determination image pattern IPD. The expectation sensing light illuminance may be a light pattern or light illuminance to be detected from the fingerprint detector 220 when a real fingerprint is sensed. For example, the light illuminance information ALI may include information such as the light pattern graph of the real fingerprint AF, which is shown in FIG. 5B.

In an embodiment, the light illuminance information ALI may be stored for each fake-determination image pattern IPD when the display device 1000 is initially set. In another embodiment, the light illuminance information ALI may be optimized according to each fake-determination image pattern IPD through fingerprint analysis in fingerprint registration of a user to be stored in the memory 228. In still another embodiment, the light illuminance information ALI may be updated in real time according to the fake-determination image pattern IPD.

The fake fingerprint detector 226 may compare light profiles of the first expected light pattern LP1 and the first sensing data SD1, and compare light profiles of the second expected light pattern LP2 and the second sensing data SD2. For example, a light profile may include a light illuminance pattern and/or a tendency of a light illuminance to change at a corresponding portion of the fake-determination image pattern IPD.

In an embodiment, the fake fingerprint detector 226 may calculate a first accordance rate between the first sensing data SD1 and the first expected light pattern LP1 and a second accordance rate between the second sensing data SD2 and the second expected light pattern LP2. A configuration for calculating the accordance rates may be implemented as a hardware configuration and/or a software configuration, such as but not limited to a type used for data comparison, optical analysis, or the like.

When each of the first accordance rate and the second accordance rate is a predetermined threshold value or more, the fake fingerprint detector 226 may determine that a sensed fingerprint is a real fingerprint. The threshold value may be variably set according to sensing sensitivity and/or security level importance. For example, when each of the first accordance rate and the second accordance rate is about 90% or more, the fake fingerprint detector 226 may determine that the sensed fingerprint is a real fingerprint. However, this is merely illustrative, and the threshold values of the first accordance rate and the second accordance rate may be set different from each other.

When at least one of the first accordance rate and the second accordance rate is less than the respective threshold value, the fake fingerprint detector 226 may determine that the sensed fingerprint is a fake fingerprint.

When it is determined that the sensed fingerprint is a real fingerprint, the fake fingerprint detector 226 may output a first approval signal AS1. When it is determined that the sensed fingerprint is the fake fingerprint, the fake fingerprint detector 226 may output a first refusal signal RS1. The first approval signal AS1 or the first refusal signal RS1 may be provided to the use approval determiner 229.

In an embodiment, the fake fingerprint detector 226 may generate an approval weight AW, based on the first accordance rate and the second accordance rate. The probability that the sensed fingerprint will be a real fingerprint increases as the first and second accordance rates increase. For example, the approval weight AW may increase as the first and second accordance rates increase. The approval weight AW may be provided to the use approval determiner 229.

The fingerprint analyzer 227 may receive third sensing data SD3 corresponding to the fingerprint sensing area FSA. Also, the fingerprint analyzer 227 may receive registered fingerprint data RFD from the memory 228. The fingerprint analyzer 227 may perform fingerprint authentication by comparing the third sensing data SD3 with the registered fingerprint data RFD.

In an embodiment, when the fake-determination image pattern IPD is not included in the fingerprint sensing area FSA, the third sensing data SD3 may include sensing data about the entire fingerprint sensing area FSA. The third sensing data SD3 may be described in greater detail, infra, with reference to FIG. 9A.

Referring now to an embodiment shown in FIG. 6B, a fingerprint detector 220_1 includes an ADC 224_1 outputting a third sensing signal SD3_1 to a fingerprint analyzer 227_1, but the other elements are substantially the same as the embodiment of FIG. 6A so duplicate description may be omitted. When the fake-determination image pattern IPD is included in the fingerprint sensing area FSA, third sensing data SD3_1 from the ADC 224_1 may include sensing data of a portion except an area corresponding to the first and second sensing data SD1 and SD2. The third sensing data SD3_1 may be compared by the fingerprint analyzer 227_1 with the other portion of the registered fingerprint data RFD except the non-emission area, and/or the fake-determination image pattern IPD, in the registered fingerprint data RFD. The third sensing data SD3_1 may be described in greater detail, infra, with reference to FIG. 9B.

Referring back to FIG. 6A, the fingerprint analyzer 227 may calculate a third accordance rate between the third sensing data SD3 and the registered fingerprint data RFD. In an embodiment, the fingerprint analyzer 227 may generate a fingerprint image corresponding to the third sensing data SD3, and perform fingerprint authentication by comparing the fingerprint image with a fingerprint image of the registered fingerprint data RFD. However, this is merely illustrative, and the method for performing fingerprint authentication may be implemented by using various fingerprint recognition methods as currently known or later developed in the art. The fingerprint analyzer 227 may include a hardware configuration and/or a software configuration, used for fingerprint authentication.

When the third accordance rate is a predetermined threshold value or more, the fingerprint analyzer 227 may determine that the sensed fingerprint accords with the registered fingerprint data RFD. When the third accordance rate is less than the threshold value, the fingerprint analyzer 227 may determine that the sensed fingerprint does not accord with the registered fingerprint data.

When it is determined that the sensed fingerprint accords with the registered fingerprint data RFD, the fingerprint analyzer 227 may output a second approval signal AS2. When it is determined that the sensed fingerprint does not accord with the registered fingerprint data RFD, the fingerprint analyzer 227 may output a second refusal signal RS2. The second approval signal AS2 or the second refusal signal RS2 may be provided to the use approval determiner 229.

The use approval determiner 229 may finally determine whether use of the display device 1000 is to be approved, based on the result of fake fingerprint determination and the result of fingerprint authentication, for example. In an embodiment, when the first approval signal AS1 and the second approval signal AS2 are generated, the use approval determiner 229 may output a use approval signal UAD to the panel driver 210 and/or an external processor. Execution of the display device 1000 or a corresponding application may be approved based on the use approval signal UAD.

In an embodiment, when at least one of the first refusal signal RS1 and the second refusal signal RS2 is generated, the use approval determiner 229 may output a use disapproval signal UDAD to the panel driver 210 and/or the external processor. The display device 1000 is not approved for the requested use and/or the corresponding application is not executed based on the use disapproval signal UDAD.

In an embodiment, the fake fingerprint detector 226 may generate the approval weight AW instead of the first approval signal AS1 and the first refusal signal RS1. The use approval determiner 229 receiving the approval weight AW and the second approval signal AS2 may determine use approval according to a magnitude of the approval weight AW. When the use approval determiner 229 receives the second refusal signal RS2, the use approval determiner 229 may output the use disapproval signal UDAD, regardless of the size of the approval weight AW.

As described above, the display device 1000 in accordance with embodiments of the present disclosure can detect a fake fingerprint by analyzing a light illuminance or light pattern in the first color pattern for a non-emission area included in the fake-determination image pattern IPD. Accordingly, the accuracy and reliability of fingerprint detection can be high without adversely impacting manufacturing cost and/or configuration.

Figure 7B:
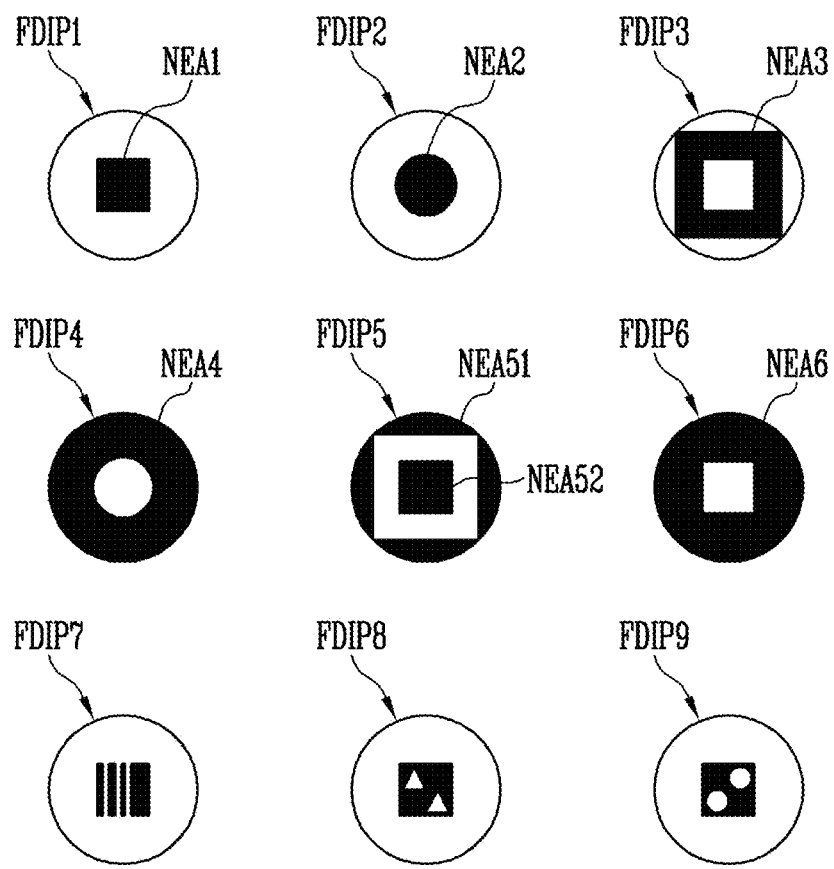
FIG. 7B is a schematic diagram illustrating various example of a fake-determination image pattern included in the image shown in FIG. 7A.

FIG. 7A illustrates an example of an image displayed on the display panel of the display device shown in FIG. 1A. FIG. 7B illustrates various examples of a fake-determination image pattern included in the image shown in FIG. 7A.

Referring to FIGS. 1A, 5A, and 7A, an image including user convenience information may be displayed. In an embodiment, the image including the user convenience information is an image for requesting a user to input a fingerprint, and may include an indication image IMAGE_IND indicating the fingerprint sensing area FSA.

As shown in FIG. 7A, the indication image IMAGE_IND may include a fingerprint pattern configured to detect forging or imitating of a fingerprint. For example, a portion representing a ridge of the fingerprint may be expressed as an emission area, and a portion representing a valley of the fingerprint may be expressed as a non-emission area.

The indication image IMAGE_IND may include a first color pattern CP1 of the fake-determination image pattern IPD of FIG. 5A. For example, in an area AA corresponding to the fake-determination image pattern IPD, such an image pattern in which a sub-emission area and a sub-non-emission area are alternately disposed as described, supra, with reference to FIG. 5A, the indication image IMAGE_IND may include the first color pattern CP1. The first color pattern CP1 may have a low luminance, and/or the other portion of the indication image IMAGE_IND except the first color pattern CP1 may be displayed as substantially black. Therefore, the indication image IMAGE_IND including the first color pattern CP1 may be viewed by a user and/or indicate the fingerprint sensing area FSA according to a relative luminance difference or a relative color difference.

The first color pattern CP1 of the fake-determination image pattern IPD may be displayed while being included in the indication image IMAGE_IND, and therefore, it may be less likely that the fake-determination image pattern IPD will be exposed or be independently identified by a user.

In some embodiments, fake-determination image patterns FDIP1 to FDIP9 may include non-emission areas NEA1 to NEA6, for displaying first color patterns, having various shapes and various sizes.

Referring to FIG. 7B, the non-emission areas NEA1 to NEA6, for displaying first color patterns, included in the fake-determination image patterns FDIP1 to FDIP9, respectively, may have a polygonal shape such as quadrangular shape, and/or a free shape such as a circular shape or an elliptical shape. In addition, a plurality of non-emission areas NEA51 and NEA52 for displaying first color patterns may be included as shown in a fifth fake-determination image pattern FDIP5. Moreover, a plurality of emission areas for displaying second color patterns, surrounding a non-emission area NEA3 for displaying a first color pattern, may be included as shown in a third fake-determination image pattern FDIP3.

In an embodiment, the fake-determination image patterns FDIP1 to FDIP9 may have the same size as the fingerprint sensing area FSA. In another embodiment, the fake-determination image patterns FDIP1 to FDIP9 may overlap with a portion of the fingerprint sensing area FSA.

In an embodiment, the pattern controller 225 may randomly or selectively change the fake-determination image pattern IPD shown in FIGS. 6A and 6B to be displayed on the display panel 100 during a predetermined period. For example, the pattern controller 225 may change the fake-determination image pattern IPD whenever the fake fingerprint determination is performed. For example, one of the first to ninth fake-determination image patterns FDIP1 to FDIP9 may be randomly selected whenever the fake fingerprint determination is performed.

Accordingly, the first expected light pattern LP1 and the second expected light pattern LP2 may be randomly changed whenever the fake fingerprint determination is performed. Thus, a fake attempt using an image or surface material having optical properties similar to those of skin can be blocked, and the reliability of fingerprint detection can be optimized.

Figure 8:
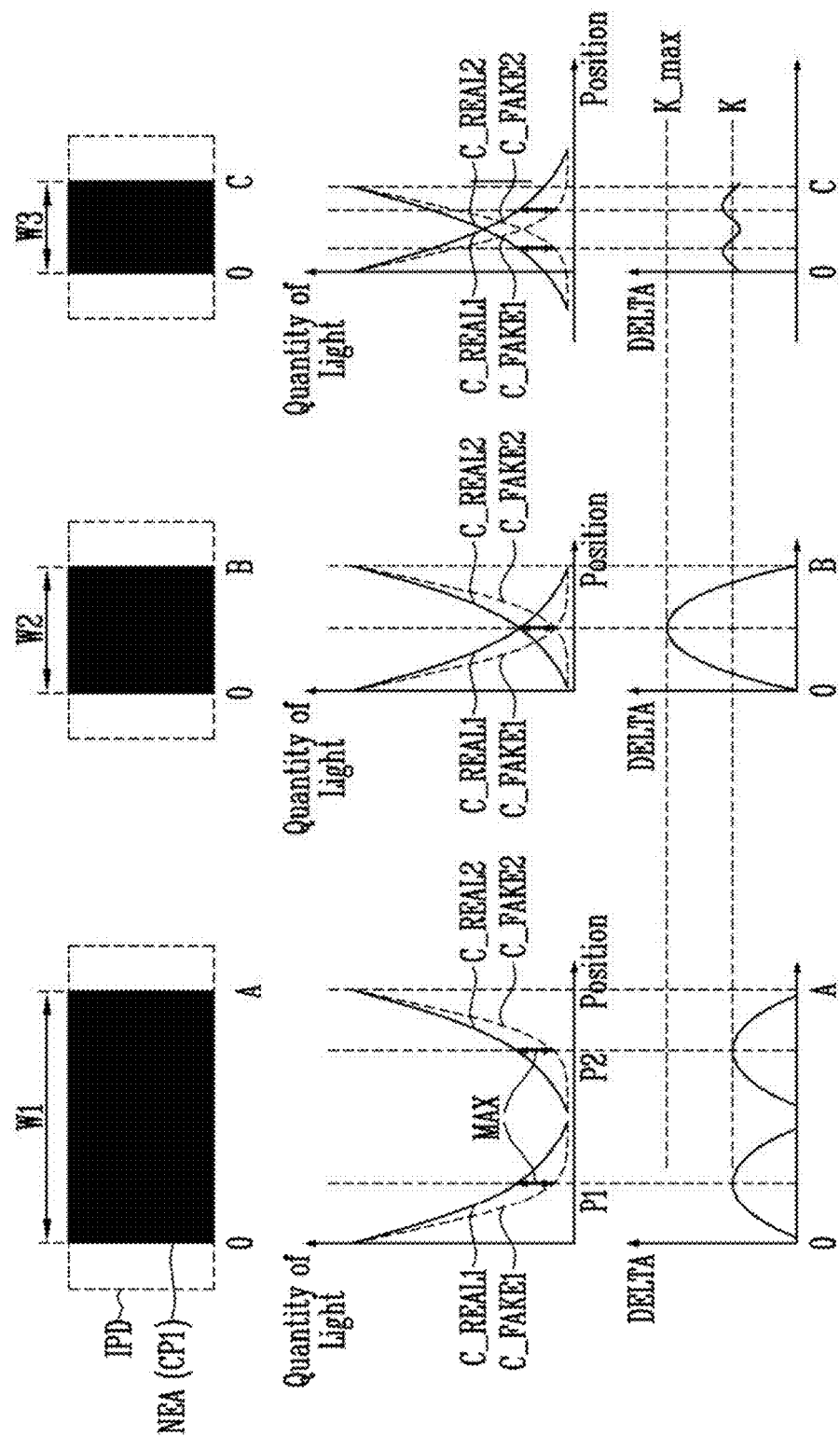
FIG. 8 is a hybrid diagram illustrating a size of a first color pattern included in the fake-determination image pattern shown in FIG. 7B.

FIG. 8 illustrates a size of the first color pattern included in the fake-determination image pattern shown in FIG. 7B.

Referring to FIGS. 5A, 7B, and 8, a size of a non-emission area NEA corresponding to the first color pattern CP1 of the fake-determination image pattern IPD may be defined as a shortest distance between emission areas, or second color patterns, adjacent to the non-emission area NEA, such as a width W1 or W2 of the non-emission area NEA. In other words, the size of the non-emission area NEA may be defined as a distance between the emission areas adjacent to the non-emission area NEA on a reference line penetrating the area center of the non-emission area NEA, for example.

In some embodiments, a width of the non-emission area of the fake-determination image pattern IPD may be set such that a light illuminance sensed in the non-emission area NEA with respect to a real fingerprint is substantially maximized.

As shown in FIG. 8, a first real graph C_REAL1 and a second real graph C_REAL2 represent light illuminance information of a sensing signal according to a real fingerprint. The first real graph C_REAL1 represents light illuminance information associated with an emission area EA, such as light emitted and diffused from the emission area EA, that is located at one side of the non-emission area NEA in the fake-determination image pattern IPD, and the second real graph C_REAL2 represents light illuminance information associated with an emission area EA, such as light emitted and diffused from the emission area EA, that is located at the other side of the non-emission area NEA in the fake-determination image pattern IPD.

Similarly, a first fake graph C_FAKE1 and a second fake graph C_FAKE2 represent light illuminance information of a sensing signal according to a fake fingerprint. The first fake graph C_FAKE1 represents light illuminance information associated with an emission area EA located at one side of the non-emission area NEA in the fake-determination image pattern IPD, and the second fake graph C_FAKE2 represents light illuminance information associated with an emission area EA located at the other side of the non-emission area NEA in the fake-determination image pattern IPD.

Each of the first real graph C_REAL1 and the second real graph C_REAL2 is relatively gently changed at a boundary portion between the emission area and the non-emission area, and each of the first fake graph C_FAKE1 and the second fake graph C_FAKE2 is relatively rapidly changed at a boundary portion between the emission area and the non-emission area. At a first point P1 spaced apart from the emission area by a specific distance, a light illuminance difference between the first real graph C_REAL1 and the first fake graph C_FAKE1 may have a maximum value MAX. Similarly, at a second point P2 spaced apart from the emission area by a specific distance, a light illuminance difference between the second real graph C_REAL2 and the second fake graph C_FAKE2 may have a maximum value MAX. Although the same maximum value MAX is shown at both points P1 and P2, it shall be understood that a first MAX1 may occur at P1, and a second MAX2 may occur at P2, where MAX1 and MAX2 may be different.

When the non-emission area NEA has a relatively large first width W1, the first point P1 and the second point P2 are located to be spaced relatively far apart from each other. Accordingly, a light illuminance difference between the real graphs C_REAL1 and C_REAL2 and the fake graphs C_FAKE1 and C_FAKE2 may be expressed as two substantially non-overlapping parabolas having a maximum value K, where K is a positive number.

When the non-emission area NEA has a second width W2 sufficiently smaller than the first width W1, the first point P1 and the second point P2 substantially overlap with each other. Accordingly, when P1 and P2 substantially overlap with each other, the light illuminance difference between the real graphs C_REAL1 and C_REAL2 and the fake graphs C_FAKE1 and C_FAKE2 may be expressed as one parabola having a value of maximum 2K. Since the difference between the light illuminance according to the real fingerprint and the light illuminance according to the fake fingerprint is large, the real fingerprint and the fake fingerprint can be more easily distinguished from each other. That is, the fake fingerprint can be more easily detected. When considering that light is hardly detected with respect to the fake fingerprint in the non-emission area NEA, the light illuminance sensed in the non-emission area NEA with respect to the real fingerprint may become largest. In other words, the second width W2 of the non-emission area NEA may be set such that the light illuminance K_max sensed in the non-emission area NEA is substantially maximized.

When the non-emission area NEA has a third width W3 smaller than the second width W2, the first point P1 and the second point P2 do not overlap with each other, and the light illuminance difference between the real graphs C_REAL1 and C_REAL2 and the fake graphs C_FAKE1 and C_FAKE2 may be expressed as a curve having values relatively close to K.

As described with reference to FIG. 8, the width of the first color pattern CP1 of the fake-determination image pattern IPD, or the non-emission area NEA corresponding to the first color pattern CP1, may be set such that the light illuminance sensed in the non-emission area NEA with respect to the real fingerprint is substantially maximized. A large difference between the light illuminance according to the real fingerprint and the light illuminance according to the fake fingerprint is represented, and the fake fingerprint can be detected on this basis, as compared with the real fingerprint.

As shown in FIG. 5A, when the fake-determination image pattern IPD includes an emission area EA, such as the second sub-emission area EA_S2 located between the first sub-non-emission area NEA_S1 and the second sub-non-emission area NEA_S2, a width of the emission area EA may be set such that a light illuminance sensed in the emission area EA is substantially minimized. For example, the width of the emission area EA may be greater than or equal to the second width W2 of the non-emission area NEA.

FIGS. 9A to 9D illustrate timing for an operation of the display device shown in FIG. 1A. In FIGS. 9A to 9D, an operation of the display device 1000 in a first mode is illustrated, and the display device 1000 may display a general image having a first refresh rate in the first mode.

Figure 9A:
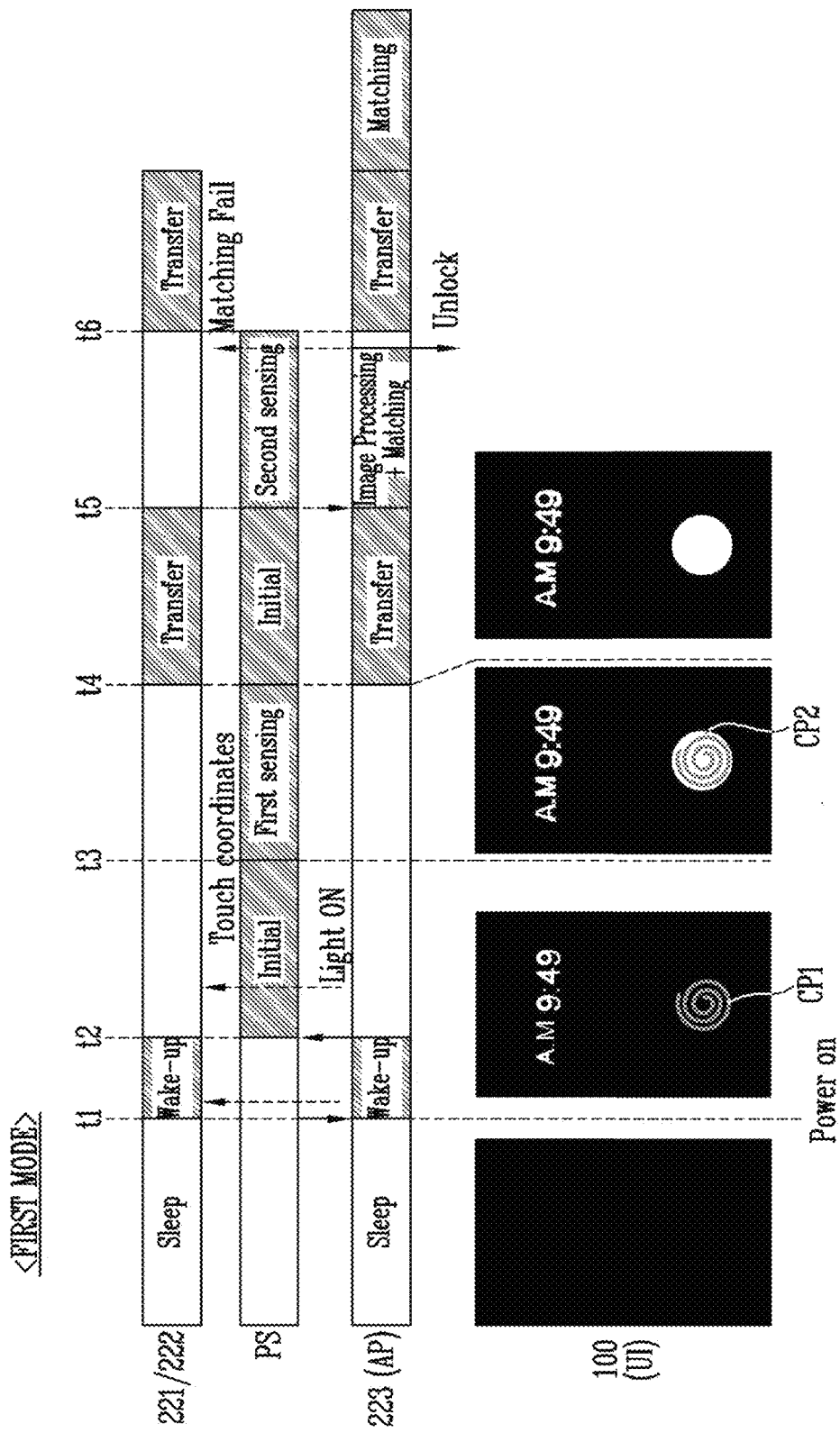

Referring to FIGS. 1A, 3A, and 9A, before a first time t1, the display device 1000 may be in a sleep state or a power-off state. Before t1, any image, such as but not limited to any user interface UI image, need not be displayed on the display panel 100.

At the first time t1, a wake-up signal may be provided to the display device 1000 from the outside. For example, the wake-up signal may be generated by a touch input, a key input, or the like to the display device 1000, and be provided to the controller 223 and/or external application processor AP. In addition, a signal corresponding to the wake-up signal may be provided to the horizontal driver 221 and the vertical driver 222. The horizontal driver 221, the vertical driver 222, and the controller 223, such as in the fingerprint detector 220, may perform a wake-up operation or starting operation in response to the wake-up signal.

At the first time t1, the pattern controller 225 described with reference to FIGS. 6A and 6B may generate a first color pattern CP1 of a fake-determination image pattern IPD, and the panel driver 210 may generate a data signal corresponding to an indication image and/or image including user convenience information, including the first color pattern CP1, and supply the generated data signal to the display panel 100. Therefore, the display panel 100 may display the indication image IMAGE_IND described with reference to FIG. 7A. For example, as shown in FIG. 9A, the first color pattern CP1 or the indication image including the same may have a planar shape of an iconic fingerprint, which may be obtained by imitating a fingerprint.

Subsequently, at a second time t2, the wake-up operation of the horizontal driver 221, the vertical driver 222, and the controller 223 may be completed, and the controller 223 may operate the photoelectric sensor PS. The photoelectric sensor PS may perform an initialization operation until before a touch input for fingerprint input occurs.

At a third time t3, the touch input for fingerprint input may occur.

In an embodiment, the display panel 100 may allow light to be additionally emitted in an emission area except the fake-determination image pattern IPD in the fingerprint sensing area in response to the touch input, such as by activating a Light ON signal. Accordingly, light may be additionally emitted in an area corresponding to a second color pattern CP2 of the fake-determination image pattern IPD, and the entire fingerprint sensing area may emit light with a high luminance.

In an embodiment, a touch coordinate with respect to a touch position at which the touch input occurs may be provided to the horizontal driver 221, and the horizontal driver 221 may operate the photoelectric sensor PS, corresponding to the touch coordinate.

In a period between the third time t3 and a fourth time t4, the photoelectric sensor PS may generate a first sensing signal for fake fingerprint determination. The first sensing signal may correspond to the first sensing data SD1 and the second sensing data SD2, which are described with reference to FIGS. 6A and 6B.

In a period from before and/or after the fourth time t4, to a fifth time t5, the vertical driver 222 may transmit the first sensing signal provided from the photoelectric sensor PS to the controller 223.

In a period between the fourth time t4 and the fifth time t5, the photoelectric sensor PS may perform an initialization operation.

In addition, at the fourth time t4, the display panel 100 may allow light to be emitted in the entire fingerprint sensing area in response to the first sensing signal. For example, the display panel 100 may suspend the display of the indication image including the fake-determination image pattern IPD, and allow the entire fingerprint sensing area to emit light.

That is, the pattern controller 225 described with reference to FIG. 6A may generate the fake-determination image pattern IPD in a first period between the first time t1 and the fourth time t4, and suspend the generation of the fake-determination image pattern IPD in a second period between the fourth time t4 and a sixth time t6.

Each of the first period and the second period may include at least one frame period. In addition, the second period may proceed after the first period is completed, although the present disclosure is not limited thereto as the periods may also proceed in parallel, or the second period may precede the first period. A fingerprint detection procedure may be performed throughout the first period and the second period, and a target object may continuously touch the fingerprint sensing area FSA for a time including at least the first period and the second period. However, this is merely illustrative, and the order, intervals, lengths, and the like of the first period and the second period are not limited thereto.

At the fifth time t5, the controller 223 may generate sensing data through image processing on the first sensing signal. The controller 223 may also compare the sensing data with predetermined light illuminance information, corresponding to the fake-determination image pattern, and perform fake fingerprint determination, through the fake fingerprint detector 226 described with reference to FIG. 6A, supra.

In an embodiment, when it is determined that a sensed fingerprint is a fake fingerprint, the controller 223 may output a first refusal signal RS1 representing an instance where matching between the sensing data and the light illuminance information has failed, such as a matching fail.

In an embodiment, when it is determined that the sensed fingerprint is a real fingerprint, the controller 223 may output a first approval signal AS1 associated with unlock of a corresponding application.

In a period between the fifth time t5 and the sixth time t6, the photoelectric sensor PS may generate a second sensing signal for fingerprint authentication. The second sensing signal may correspond to the third sensing data SD3 described with reference to FIG. 6A.

Before and/or after the sixth time t6, the vertical driver 222 may transmit the second sensing signal provided from the photoelectric sensor PS to the controller 223, and the controller 223 may generate sensing data about the second sensing signal and perform fingerprint authentication by comparing the sensing data with registered fingerprint data through the fingerprint analyzer 227 or 227_1, such as described with reference to FIGS. 6A and 6B, respectively.

Since the sensing data is acquired by using the total light information which the photoelectric sensor PS receives, the accuracy and reliability of fingerprint authentication can be optimized.

Although it has been described that the display panel 100 allows light to be emitted in the entire fingerprint sensing area in response to the transmission of the first sensing signal at the fourth time t4, the present disclosure is not limited thereto.

Figure 9B:
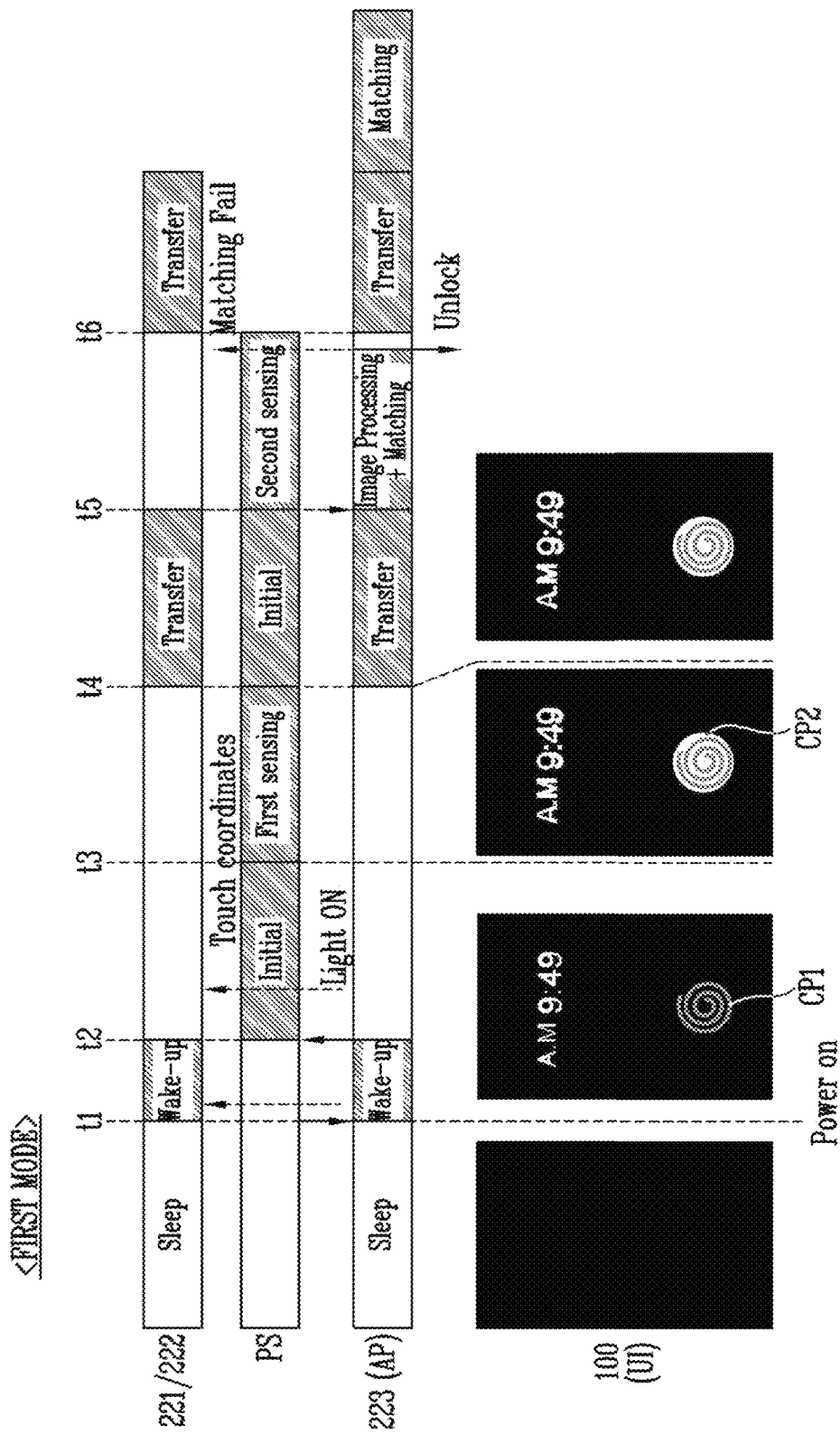

As shown in FIG. 9B, like the period between the third time t3 and the fourth time t4, the display panel 100 may additionally display an image including the fake-determination image pattern IPD at the fourth time t4. In the period between the fifth time t5 and the sixth time t6, the photoelectric sensor PS may generate a second sensing signal for fingerprint authentication, and the second sensing signal may correspond to the third sensing data SD3_1 described with reference to FIG. 6B.

Although it has been described that, at the third time t3, the first color pattern CP1 is maintained, and light is additionally emitted in an area corresponding to the second color pattern CP2, the present disclosure is not limited thereto.

Figure 9D:
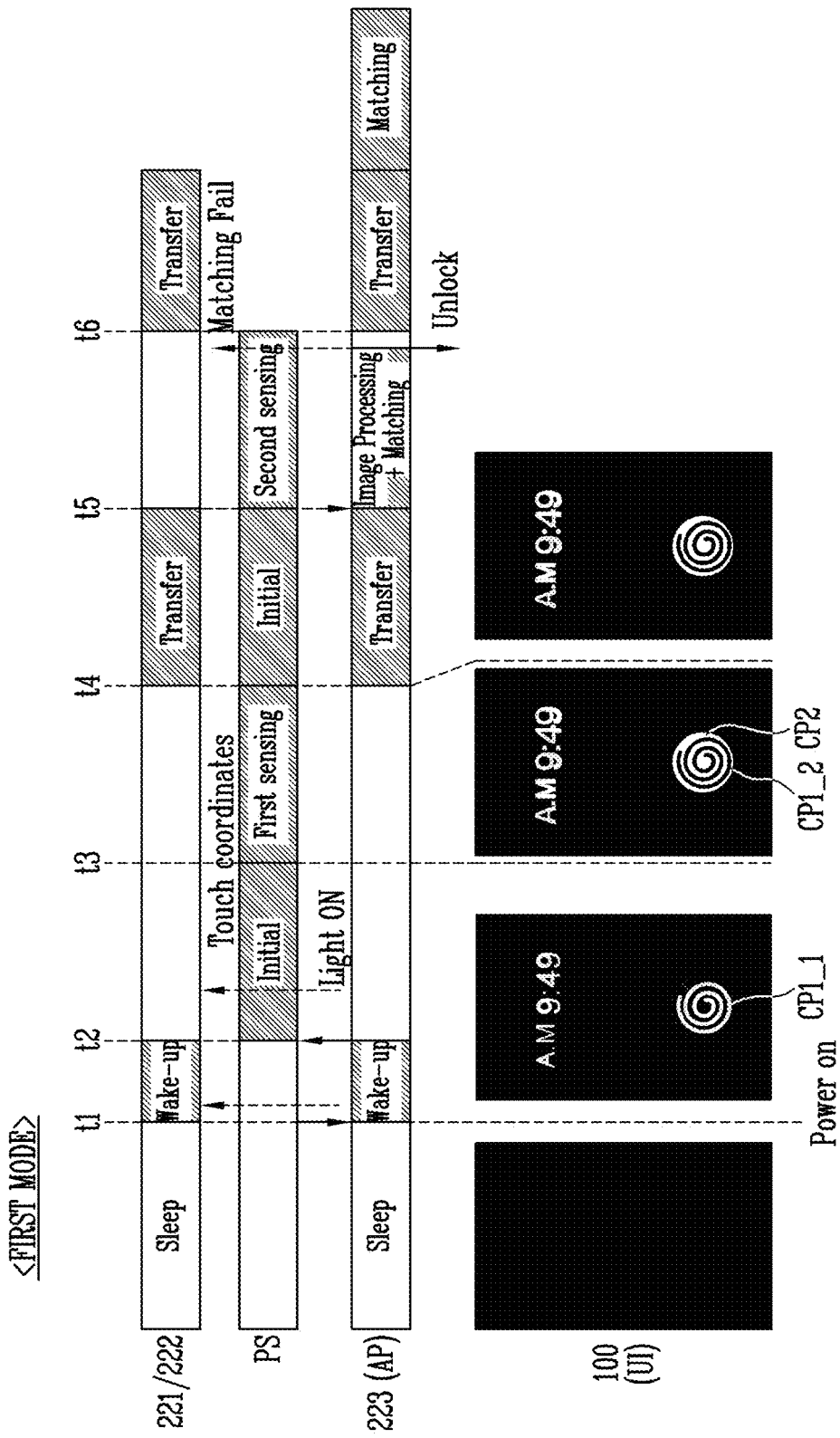

An embodiment modifying FIG. 9A is illustrated in FIG. 9C, and an embodiment modifying FIG. 9B is illustrated in FIG. 9D. Duplicate description may be omitted.

As shown in FIGS. 9C and 9D, a luminance and/or a color of a first color pattern CP1_1 and CP1_2 may be changed from CP1_1 to CP1_2 at the third time t3. For example, a first color pattern CP1_1 having a relatively high luminance, such as the first color pattern CP1_1 corresponding to white, may be displayed until the third time t3, and a first color pattern CP1_2 having a relatively lower luminance, such as the first color pattern CP1_2 corresponding to black, may be displayed after the third time t3. That is, a planar shape of the first color pattern CP1_1 and CP1_2, and/or a planar shape of an indication image including the same, is not changed, and the luminance and/or the color of the first color pattern CP1_1 and CP1_2 may be changed with respect to before and after the third time t3. For example, the first and second color patterns CP1 and CP2 may be concurrently displayed by the display pixels PXL and sensed by the photoelectric sensor pixels SPXL.

Since light is additionally emitted in an area corresponding to the second color pattern CP2 at the third time t3, the luminance and/or the color of the fake-determination image pattern including the first color pattern CP1_1 and CP1_2 and the second color pattern CP2 may be reversed with respect to the third time t3. That is, in an embodiment, a first color pattern having a relatively lower luminance, such as one corresponding to black, may be displayed before the third time t3, and a first color pattern having a relatively high luminance, such as one corresponding to white, may be displayed after the third time t3.

As described with reference to FIGS. 9A to 9D, the display device 1000 may detect a fake fingerprint by using the fake-determination image pattern IPD displayed in the first period, and perform fingerprint authentication by using sensing data sensed in the second period. Thus, the reliability of the fake fingerprint detection and the fingerprint authentication can be optimized.

The display device 1000 may also display an indication image including the first color pattern of the fake-determination image pattern IPD through the display panel 100, before a touch input to the fingerprint sensing area FSA for fingerprint input occurs. That is, the fake-determination image pattern IPD is substantially displayed before the touch input occurs in addition to after the touch input occurs, so that the time at which the fake-determination image pattern IPD is displayed can be set freely. Further, since the first color pattern CP1 of the fake-determination image pattern IPD is included in the indication image, the fake-determination image pattern IPD can be prevented from being independently identified by a user or being exposed to the user, even when a state is maintained in which the fake-determination image pattern IPD is displayed before the touch input occurs.

Although an exemplary embodiment has been described with respect to FIGS. 9A to 9D where the indication image including the fake-determination image pattern is displayed on the display panel 100 when a wake-up signal based on the touch input, the key input, or the like to the display device 1000 is provided, the present disclosure is not limited thereto.

Figure 10A:
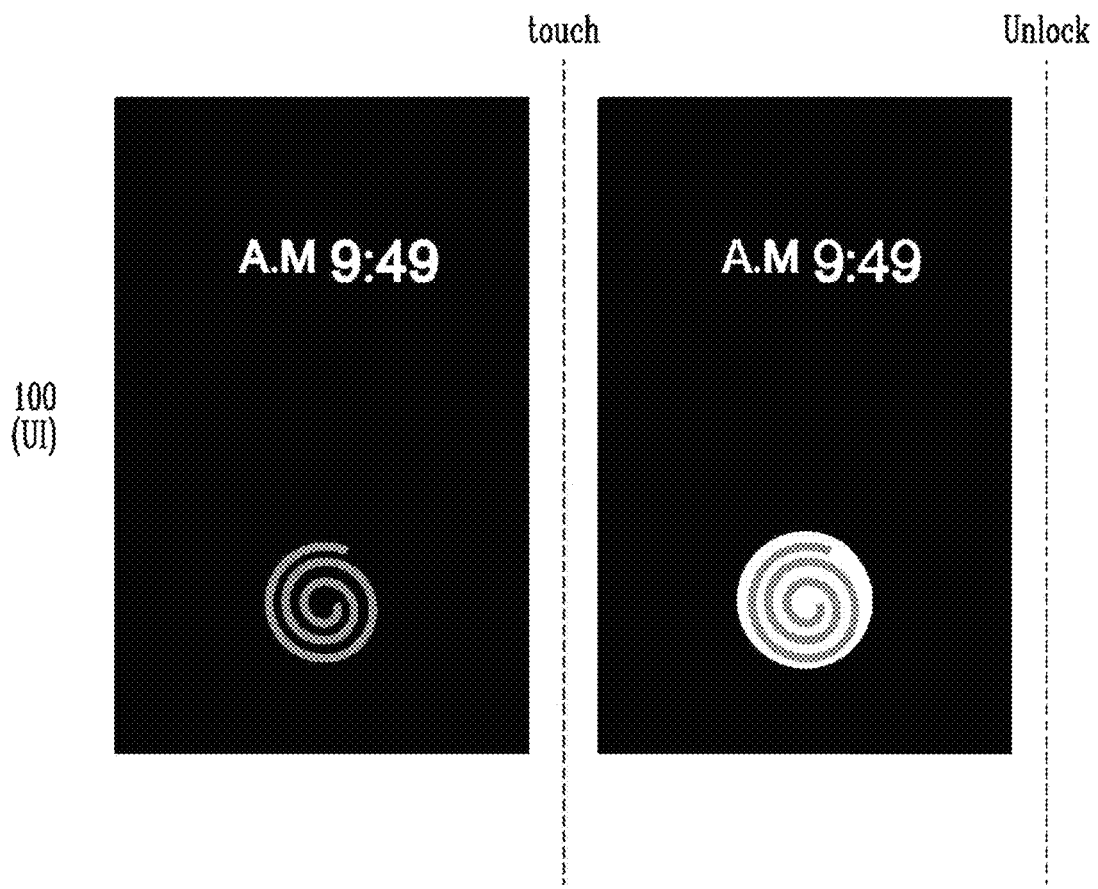
FIGS. 10A and 10B are schematic diagrams illustrating an operation of the display device shown in FIG. 1A.
Figure 10B:
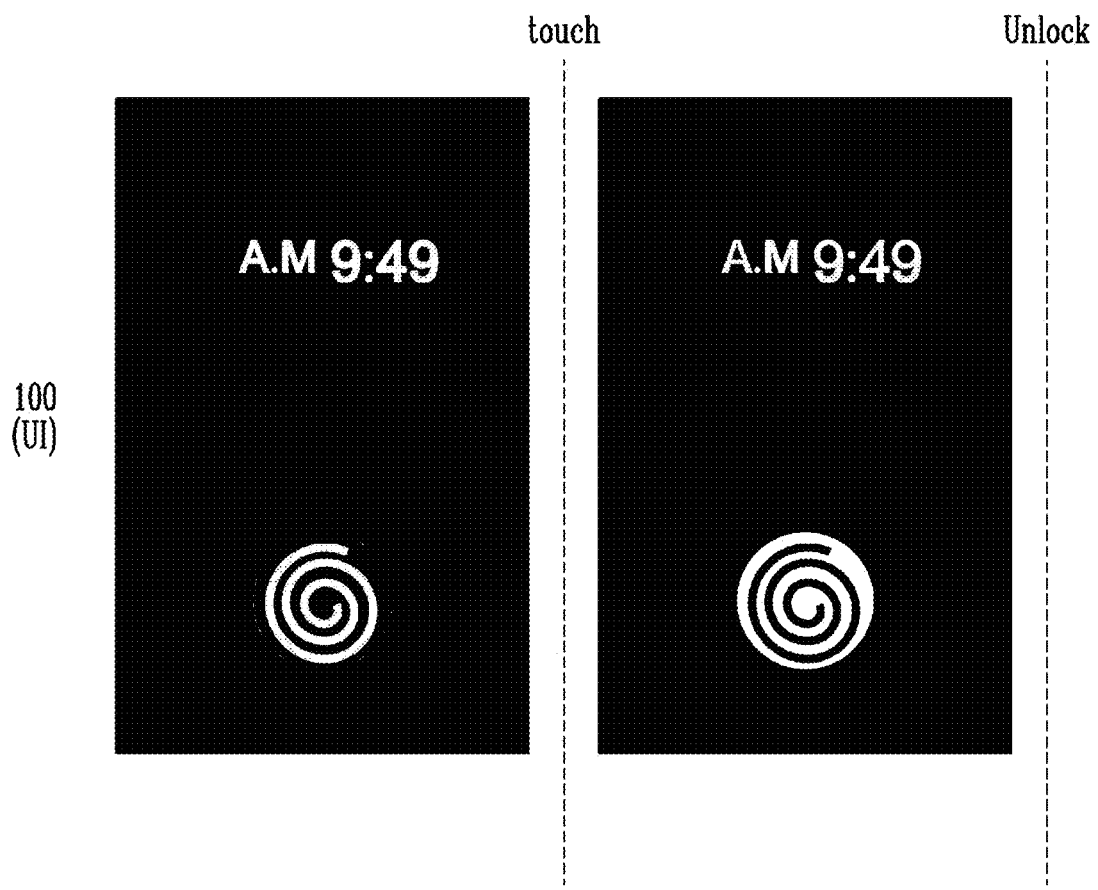

FIGS. 10A and 10B illustrate an operation of the display device shown in FIG. 1A. In FIGS. 10A and 10B, an operation of the display device 1000 in a second mode is illustrated, and the display device 1000 may display a power-saving image having a second refresh rate slower than the first refresh rate in the second mode. For example, the second mode may be an always on display (AOD) mode in which the display device 1000 displays a partially limited image in a sleep state.

In the sleep state, the display device 1000 may display the indication image IMAGE_IND described with reference to FIG. 7A, such as the indication image including the first color pattern of the fake-determination image pattern IPD.

As shown in FIG. 10A, when a touch input for fingerprint input occurs, the display panel 100 may allow light to be additionally emitted in an emission area except for the first color pattern CP1 shown in FIGS. 9A and 9B of the fake-determination image pattern IPD in the fingerprint sensing area, in response to the touch input. Alternatively, as shown in FIG. 10B, when a touch input for fingerprint input occurs, the display panel 100 may allow the fake-determination image pattern IPD to be reversed in the fingerprint sensing area, in response to the touch input.

That is, the display device 1000 may perform an operation after the third time t3 described with reference to FIGS. 9A to 9D. A corresponding application may be unlocked based on both a qualifying fake fingerprint determination result and a qualifying fingerprint authentication result.

As described with reference to FIGS. 10A and 10B, the indication image including the first color pattern of the fake-determination image pattern IPD may be displayed on the display panel 100, even before the wake-up signal is provided to the display device 1000.

FIG. 11 illustrates a method for driving the display device in accordance with embodiments of the present disclosure.

Hereinafter, in FIGS. 11 to 16, components substantially similar to those described above may be designated by like reference numerals, and overlapping descriptions of the components may be omitted.

Referring to FIGS. 1A to 11, in the method for driving the display device, a fake-determination image pattern IPD including an emission area EA and a non-emission area NEA may be displayed in the fingerprint sensing area FSA at function block S100, sensing data corresponding to the fingerprint sensing area FSA may be generated by using the photoelectric sensor PS at function block S200, a fake fingerprint may be determined by comparing light illuminance information ALI corresponding to the fake-determination image pattern IPD with the sensing data at function block S300, fingerprint authentication may be performed by comparing the sensing data with registered fingerprint data RFD at function block S400, and use approval may be determined based on a fingerprint authentication result and a fake fingerprint determination result at function block S500.

A detailed operation of the method including the fingerprint authentication and the fake fingerprint determination may be performed by using various methods as shown in FIGS. 12 to 16.

An exemplary embodiment method of FIG. 11 for driving the display device 1000 of FIG. 1 includes displaying a first image including user convenience information through a display panel at block S100; generating sensing data corresponding to a fingerprint sensing area by using a photoelectric sensor at block S200; and determining whether a sensed fingerprint corresponding to the sensing data is a fake fingerprint by comparing expected sensing light illuminance information based on the first image with sensed light illuminance information of the sensing data at block S300, where the first image includes a first color pattern CP1 in the fingerprint sensing area FSA of the display panel 100, and the fake-determination image pattern includes the first color pattern and a second color pattern CP2 different from the first color pattern.

Figure 12:
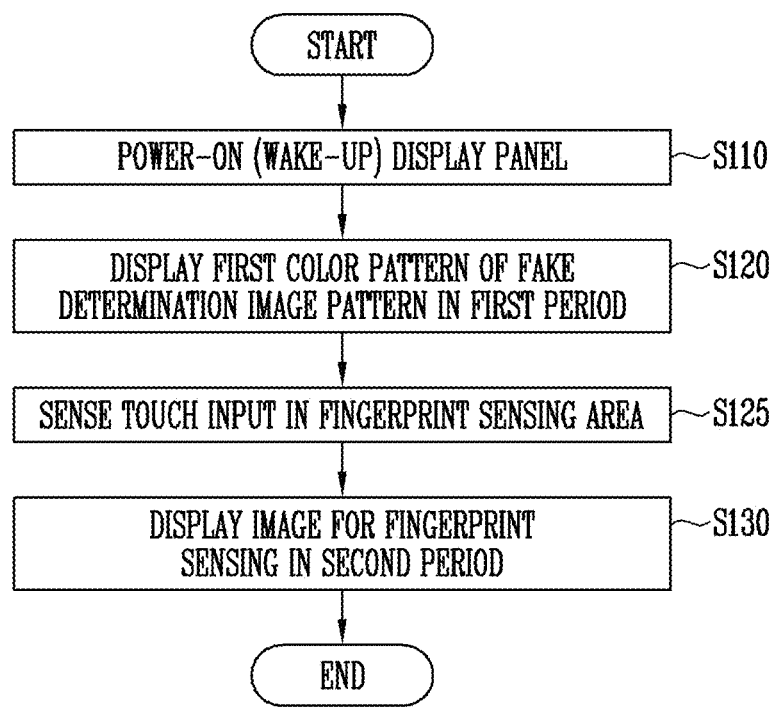
FIG. 12 is a flowchart diagram illustrating an example of the method shown in FIG. 11.

FIG. 12 illustrates an example of the method shown in FIG. 11.

Referring to FIGS. 1A, 3A, 9A to 9D, and 11, the display panel 100 may be powered on at function block S110 or perform a wake-up operation in response to a wake-up signal generated by a touch input, a key input, or the like to the display device 1000.

Subsequently, in a first period, a first color pattern CP1 of a fake-determination image pattern IPD may be displayed on the display panel 100 at function block S120. A non-limiting example will be described with reference to FIG. 9A. The first period may be a period between the first time t1 and the fourth time t4.

A touch input may be sensed in the fingerprint sensing area FSA at function block S125, and a first sensing signal for fingerprint determination may be generated by the photoelectric sensor PS in response to the touch input. Fake fingerprint determination may be performed based on the first sensing signal in the controller 223 and/or application processor.

In a second period such as after the fourth time t4, the display of the fake-determination image pattern IPD on the display panel 100 may be suspended, and an image for fingerprint sensing may be displayed at function block S130. A non-limiting example will be described with reference to FIG. 9A. The second period may be a period between the fourth time t4 and the sixth time t6. However, the present disclosure is not limited thereto. A non-limiting example will be described with reference to FIG. 9B. The image for fingerprint sensing may include the fake-determination image pattern IPD.

As described with reference to FIG. 9A, the display panel 1000 may allow the entire fingerprint sensing area to emit light. A second sensing signal for fingerprint authentication may be generated by the photoelectric sensor PS, and fingerprint authentication may be performed based on the second sensing signal in the controller 223 and/or application processor.

Figure 13:
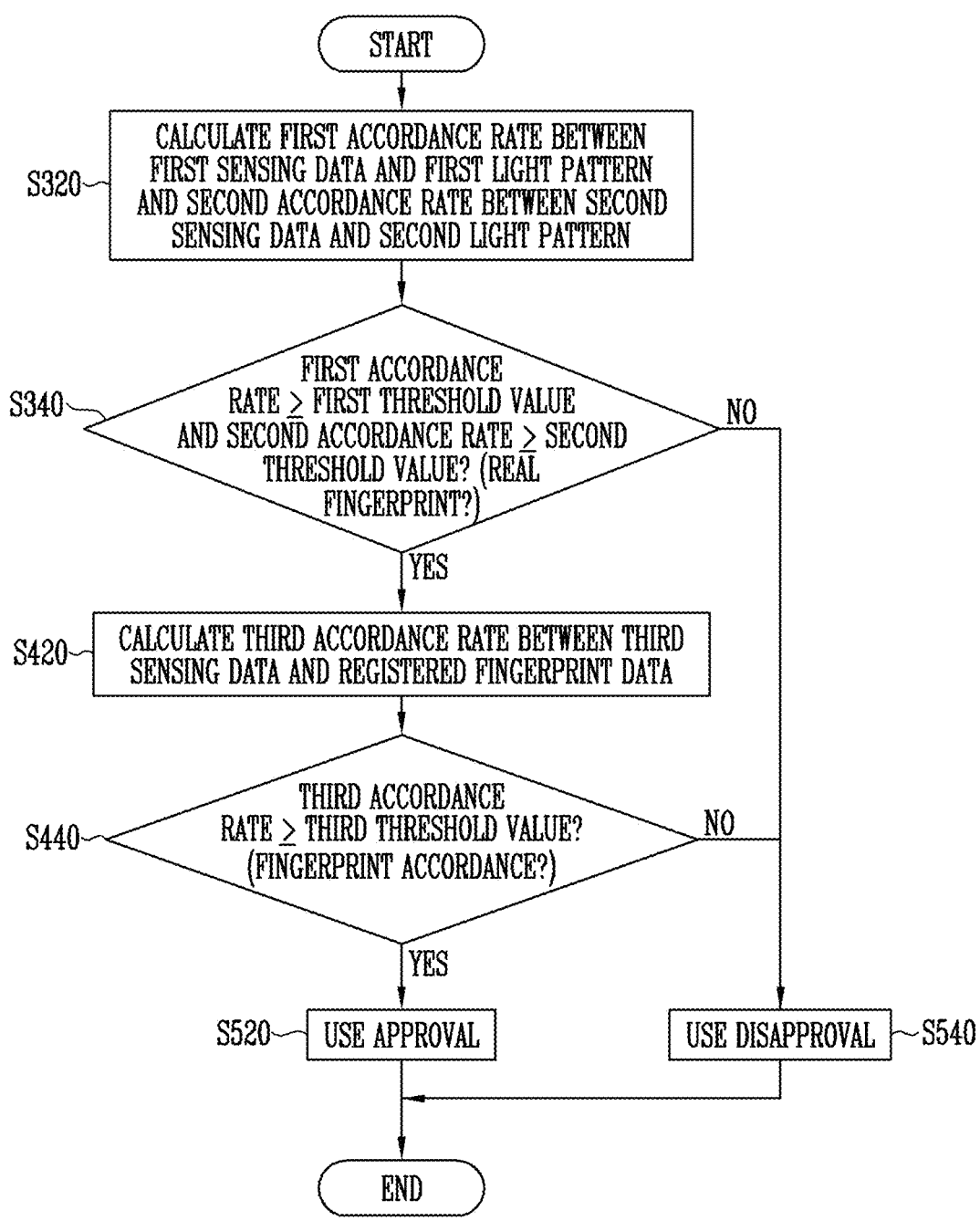
FIG. 13 is a flowchart diagram illustrating another example of the method shown in FIG. 11.

FIG. 13 illustrates an example of the method shown in FIG. 11.

Referring to FIGS. 1A to 13, a fake fingerprint determination procedure and a fingerprint authentication procedure may be sequentially performed by using light sensed from the fingerprint sensing area FSA including a fake-determination image pattern IPD.

At function block S200 of FIG. 11, first to third sensing data SD1, SD2, and SD3 may be generated based on the light sensed from the fingerprint sensing area FSA including the fake-determination image pattern IPD.

At function block S300 of FIG. 11, determining the fake fingerprint may include calculating a first accordance rate by comparing a first expected light pattern LP1 of an emission area EA, which is included in light illuminance information ALI, with the first sensing data SD1, and calculating a second accordance rate by comparing a second expected light pattern LP2 included in the light illuminance information ALI with the second sensing data SD2 at function block S320 of FIG. 13.

The first accordance rate may be compared with a first threshold value, and the second accordance rate may be compared with a second threshold value at decision block S340 of FIG. 13.

When the first accordance rate is less than the first threshold value and when the second accordance rate is less than the second threshold value, it may be determined that a sensed fingerprint is a fake fingerprint. In addition, when the first accordance rate is less than the first threshold value or when the second accordance rate is less than the second threshold value, it may be determined that the sensed fingerprint is a fake or unauthorized fingerprint. When it is determined that the sensed fingerprint is a fake fingerprint or an unauthorized fingerprint, the use of the display device 1000 or a corresponding application may be disapproved at function block S540. In addition, when it is determined that the sensed fingerprint is a fake fingerprint, the function block S400 of FIG. 11, for performing the fingerprint authentication, may be omitted.

When the first accordance rate is the first threshold value or more and when the second accordance rate is the second threshold value or more, it may be determined that the sensed fingerprint is a real fingerprint. In addition, when the first accordance rate is the first threshold value or more and when the second accordance rate is the second threshold value or more, the function block S400 for performing the fingerprint authentication, which is shown in FIG. 11, may be executed.

For example, the function block S400 of FIG. 11 for performing the fingerprint authentication may include calculating a third accordance rate as an accordance rate between third sensing data SD3 and registered fingerprint data RFD at function block S420 of FIG. 13, and comparing the third accordance rate with a third threshold value at function block S440 of FIG. 13.

When the third accordance rate is less than the third threshold value, it may be determined that the sensed fingerprint does not accord with the registered fingerprint data RFD. For example, when it is determined that the sensed fingerprint does not accord with the registered fingerprint data RFD, the use of the display device 1000 or the corresponding application may be disapproved at function block S540 of FIG. 13.

When the third accordance rate is the third threshold value or more, it may be determined that the sensed fingerprint accords with the registered fingerprint data RFD. For example, when it is determined that the sensed fingerprint accords with the registered fingerprint data RFD, the use of the display device 1000 or the corresponding application may be approved at function block S520 of FIG. 13.

That is, when it is determined that the third sensing data SD3 and the registered fingerprint data RFD accord with each other, and the sensed fingerprint is a real fingerprint, the use of the display device 1000 or the corresponding application may be approved at function block S520 of FIG. 13.

As described above, in the method in accordance with the embodiment shown in FIG. 13, the fingerprint authentication is performed after it is determined whether or not the sensed fingerprint is a fake fingerprint, such that the calculation load in fingerprint detection and/or authentication can be decreased.

Figure 14:
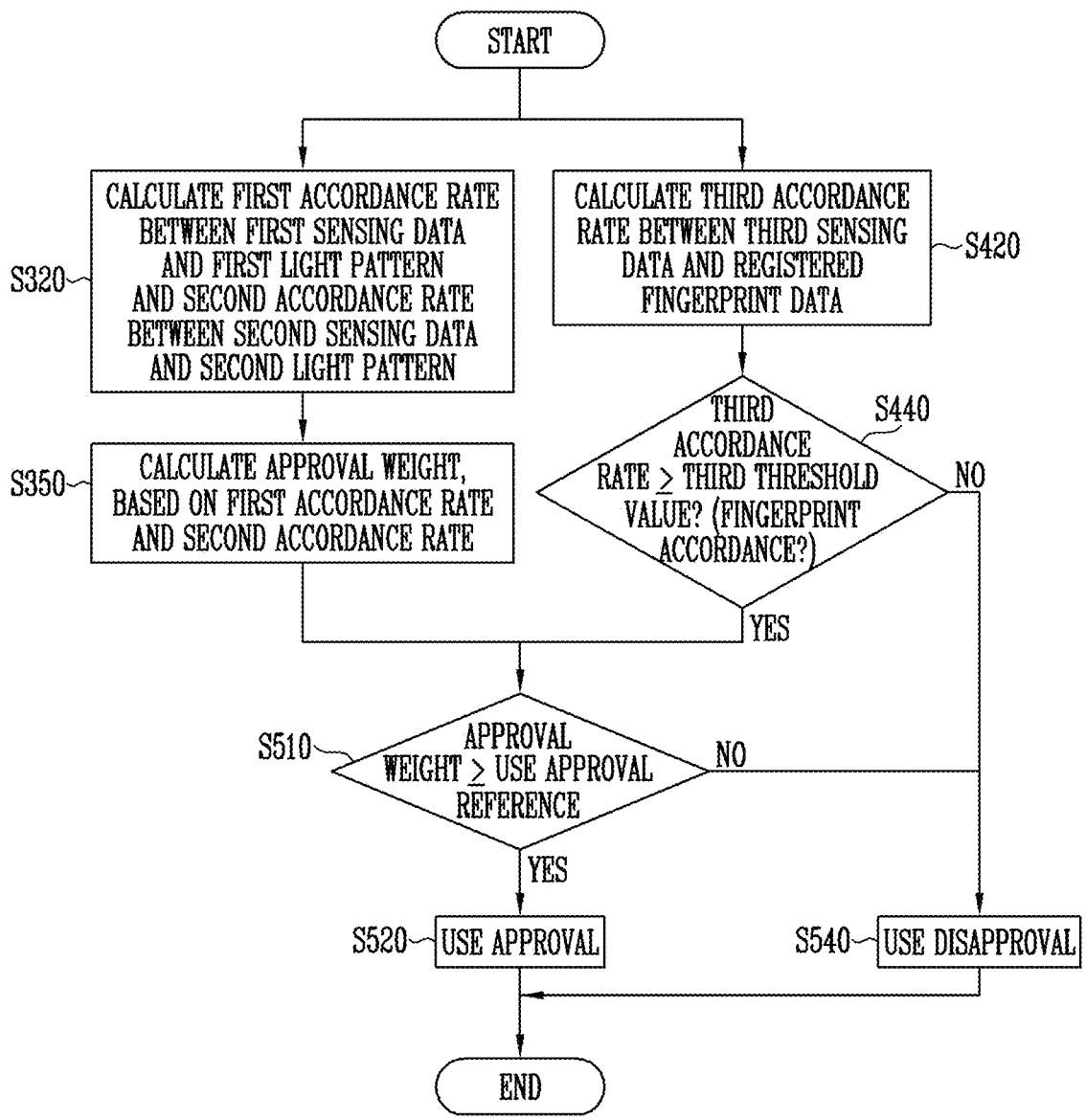
FIG. 14 is a flowchart diagram illustrating still another example of the method shown in FIG. 11.

FIG. 14 illustrates an example of the method shown in FIG. 11.

Referring to FIGS. 1A to 11 and 14, a fake fingerprint determination procedure and a fingerprint authentication procedure may be performed in parallel by using light sensed from the fingerprint sensing area FSA including a fake-determination image pattern IPD.

The function block S300 of FIG. 11 for determining the fake fingerprint may include calculating first and second accordance rates at function block S320 of FIG. 14, and calculating an approval weight AW, based on the first accordance rate and the second accordance rate at function block S350 of FIG. 14.

In an embodiment, the function block S400 of FIG. 11 for performing the fingerprint authentication may be performed in parallel to the function block S300 of FIG. 11 for determining the fake fingerprint. The function block S400 of FIG. 11 for performing the fingerprint authentication may include calculating a third accordance rate at function block S420 of FIG. 14, and comparing the third accordance rate and a third threshold value at decision block S440 of FIG. 14.

When the third accordance rate is less than the third threshold value, the use of the display device 1000 or a corresponding application may be disapproved at function block S540 of FIG. 14.

When a third accordance rate is the third threshold value or more, the function block S500 of FIG. 11 for determining the use approval may be performed. The approval weight AW and a predetermined use approval reference may be compared at decision block S510 of FIG. 14.

When the approval weight AW is the use approval reference or more, the use of the display device 1000 or the corresponding application may be approved at function block S520 of FIG. 14.

When the approval weight AW is less than the use approval reference, the use of the display device 1000 or the corresponding application may be disapproved at function block S540 of FIG. 14.

As described above, an image is acquired once by reflected light in the fingerprint sensing area FSA including the fake-determination image pattern IPD, so that the fake fingerprint detection and the fingerprint authentication can be performed in parallel. Thus, the time required to perform fingerprint detection and use approval can be minimized.

Figure 15:
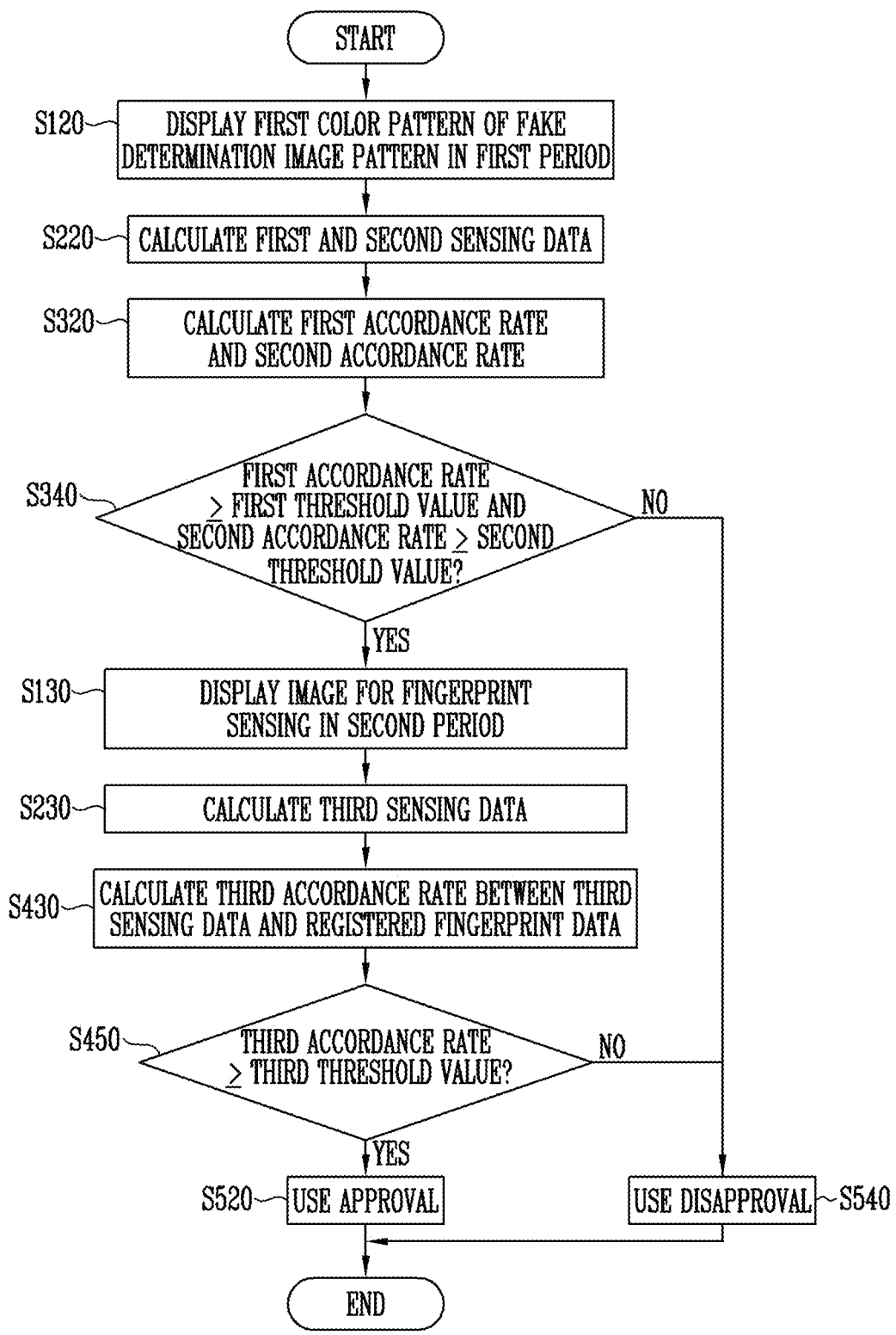
FIG. 15 is a flowchart diagram illustrating still another example of the method shown in FIG. 11.

FIG. 15 illustrates an example of the method shown in FIG. 11.

In FIG. 15, components substantially similar to those described with reference to FIGS. 11 and 13 may be designated by like reference numerals, and overlapping descriptions of such components may be omitted.

Referring to FIGS. 1A to 13 and 15, the function block S300 of FIG. 11 for determining the fake fingerprint may be performed based on a fake-determination image pattern IPD in a first period, and the function block S400 of FIG. 11 for performing the fingerprint authentication may be performed based on an image for fingerprint sensing in a second period.

In the first period, a first color pattern CP1 of the fake-determination image pattern IPD may be displayed in the fingerprint sensing area FSA at function block S120 of FIG. 15. First and second sensing data SD1 and SD2 may be calculated based on the fake-determination image pattern IPD at function block S220, and first accordance rate and a second accordance rate may be calculated at function block S320.

Then, the first accordance rate and a first threshold value may be compared, and the second accordance rate and a second threshold value may be compared at decision block S340.

When the first accordance rate is less than the first threshold value or when the second accordance rate is less than the second threshold value, the use of the display device 1000 or a corresponding application may be disapproved at function block S540.

When the first accordance rate is the first threshold value or more and when the second accordance rate is the second threshold value or more, the second period may proceed. In the second period, an image for fingerprint sensing may be displayed in the fingerprint sensing area FSA at function block S130 of FIG. 15. For example, the entire fingerprint sensing area FSA may emit light with a high luminance in the second period.

Third sensing data SD3 about the entire fingerprint sensing area FSA may be calculated at function block S230, and a third accordance rate between the third sensing data SD3 and registered fingerprint data RFD may be calculated at function block S430.

The third accordance rate and a third threshold value may be compared at decision block S450. If the third accordance rate is less than the third threshold value, the use of the display device 1000 and the corresponding application may be disapproved at function block S540. When the third accordance rate is the third threshold value or more, the use of the display device 1000 and the corresponding application may be approved at function block S520.

In the embodiment shown in FIG. 15, the reliability of fake fingerprint detection and the reliability of fingerprint authentication can be further optimized, as compared with the method shown in FIG. 13.

Figure 16:
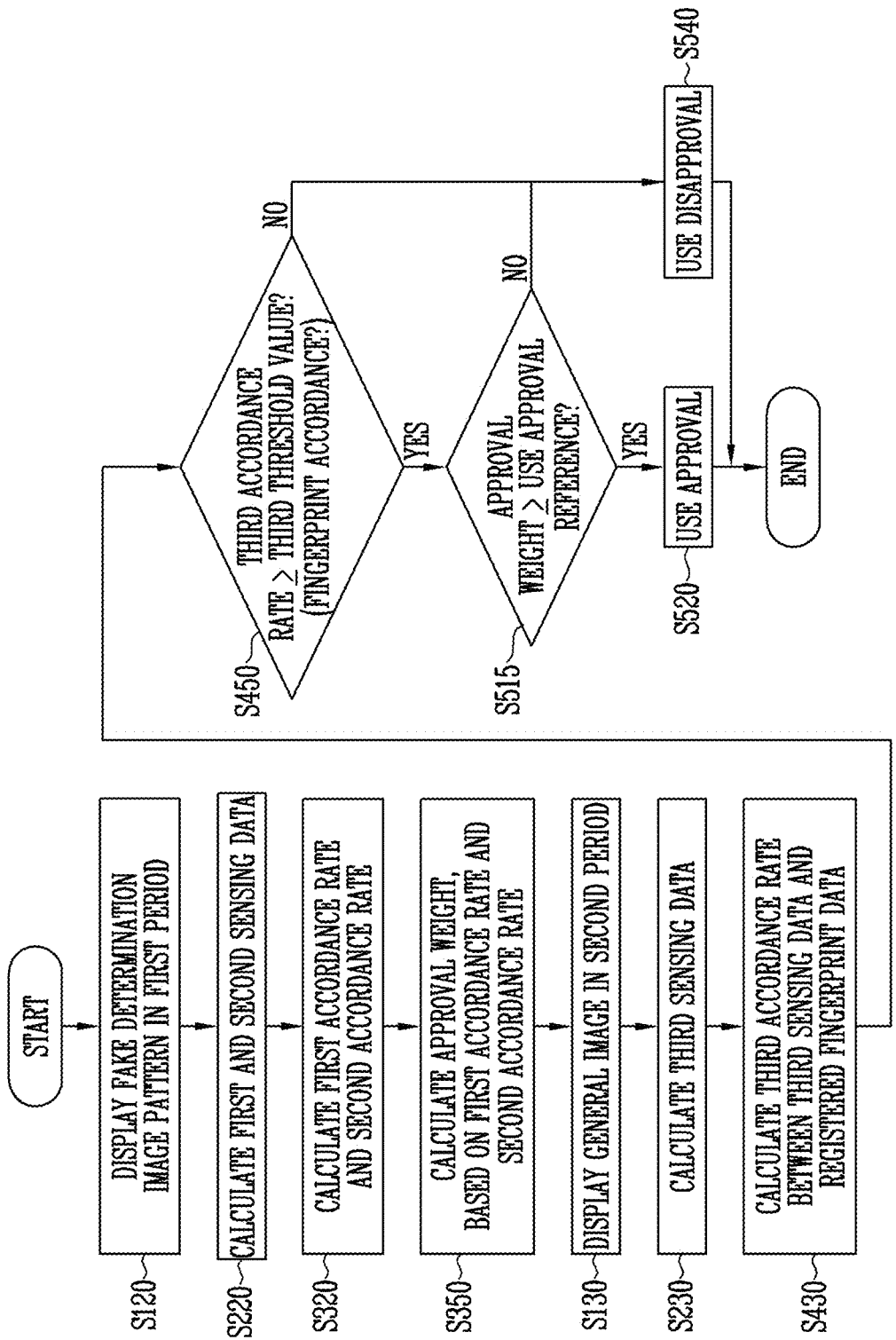
FIG. 16 is a flowchart diagram illustrating still another example of the method shown in FIG. 11.

FIG. 16 illustrates an example of the method shown in FIG. 11.

In FIG. 16, components substantially similar to those described with reference to FIGS. 11, 14 and/or 15 may be designated by like reference numerals, and overlapping descriptions of such components may be omitted.

Referring to FIGS. 1A to 16, the function block S300 of FIG. 11 for determining a fake fingerprint, based on a fake-determination image pattern IPD, may be performed in a first period, and the function block S400 of FIG. 11 for performing the fingerprint authentication, based on a general image, may be performed in a second period P2.

In an embodiment, an approval weight AW may be calculated based on a first accordance rate and a second accordance rate at function block S350 of FIG. 16. In addition, fingerprint authentication, such as including function blocks S130, S230, S430, and decision block S450 of FIG. 16, based on third sensing data SD3, may be performed in a second period, regardless of the result of the approval weight AW.

The approval weight AW and a use approval reference may be compared at decision block S515.

If a third accordance rate is a third threshold value or more and when the approval weight AW is the use approval reference or more, the use of the display device 1000 or a corresponding application may be approved at function block S520. If the third accordance rate is less than the third threshold value or if the approval weight AW is less than the use approval reference, the use of the display device 1000 or the corresponding application may be disapproved at function block S540.

In the embodiment shown in FIG. 16, the accuracy of fake fingerprint determination may be optimized.

As described above, in the display device and the method for driving the same in accordance with the embodiments of the present disclosure, a fake fingerprint can be detected by analyzing a light illuminance or light pattern in the non-emission area included in a fake-determination image pattern. Accordingly, the accuracy and reliability of fingerprint detection can be optimized without adversely impacting manufacturing cost and/or configuration.

Exemplary embodiments have been disclosed herein, and although specific terms are employed, they are used and are to be interpreted in a generic and descriptive sense and not for purposes of limitation. In some instances, as would be apparent to one of ordinary skill in the pertinent art as of the filing or priority date of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the pertinent art that various changes in form and details may be made without departing from the scope and sprit of the present disclosure as set forth in the following claims.

What is claimed is:

1. A display device comprising:
a display panel including a plurality of pixels, the display panel displaying a first image including user convenience information;
a photo sensor disposed on one surface of the display panel and configured to sense light; and
a fingerprint detector configured to determine whether a sensed fingerprint corresponding to a sensing signal supplied from the photo sensor is a fake fingerprint, based on the sensing signal,
wherein the first image includes a fake-determination image pattern in a fingerprint sensing area of the display panel, and the fake-determination image pattern includes a first pattern having a first planar shape,
wherein the user convenience information includes an indication image indicating the fingerprint sensing area,
wherein the indication image incudes the fake-determination image pattern,
wherein, when a touch input occurs in the fingerprint sensing area, a color or luminance of the fake-determination image pattern is reversed, and the first planar shape of the first pattern is not changed.

2. The display device of claim 1, wherein the fingerprint detector determines whether the sensed fingerprint is a fake fingerprint by analyzing a light illuminance sensed in a first area in which the first pattern is displayed.

3. The display device of claim 2, wherein if the light illuminance sensed in the first area is smaller than a predetermined first reference light illuminance, the fingerprint detector determines that the sensed fingerprint is a fake fingerprint.

4. The display device of claim 2, wherein, when a light illuminance sensed in a second area in which the first pattern is not displayed is greater than a predetermined second reference light illuminance, the fingerprint detector determines that the sensed fingerprint is a fake fingerprint.

5. The display device of claim 1,
wherein the first image includes a fingerprint pattern imitating a fingerprint, and
wherein the fingerprint pattern includes the first pattern.

6. The display device of claim 1, wherein the fingerprint detector controls the fake-determination image pattern of the fingerprint sensing area of the display panel, which is used for fingerprint sensing, and performs fingerprint authentication on the sensed fingerprint, based on the sensing signal.

7. The display device of claim 6,
wherein the fingerprint detector includes:
a pattern controller configured to generate the fake-determination image pattern such that the first pattern is included in the fingerprint sensing area;
a fake fingerprint detector configured to perform fake fingerprint determination by comparing first sensing data corresponding to the first pattern of the fake-determination image pattern with light illuminance information set corresponding to the fake-determination image pattern; and
a fingerprint analyzer configured to perform the fingerprint authentication by comparing second sensing data corresponding to the fingerprint sensing area with registered fingerprint data.

8. The display device of claim 7, wherein the fingerprint analyzer is configured to perform the fingerprint authentication by comparing the second sensing data corresponding to the fingerprint sensing area except the first pattern with the registered fingerprint data.

9. A display device comprising:
a display panel including a plurality of pixels, the display panel displaying a first image including user convenience information;
a photo sensor disposed on one surface of the display panel and configured to sense light; and
a fingerprint detector configured to determine whether a sensed fingerprint corresponding to a sensing signal supplied from the photo sensor is a fake fingerprint based on the sensing signal,
wherein the first image includes a fake-determination image pattern in a fingerprint sensing area of the display panel, and the fake-determination image pattern includes a first pattern having a first planar shape,
wherein the fingerprint detector controls the fake-determination image pattern of the fingerprint sensing area of the display panel, which is used for fingerprint sensing, and performs fingerprint authentication on the sensed fingerprint, based on the sensing signal,
wherein the fingerprint detector includes:
a pattern controller configured to generate the fake-determination image pattern such that the first pattern is included in the fingerprint sensing area;
a fake fingerprint detector configured to perform fake fingerprint determination by comparing first sensing data corresponding to the first pattern of the fake-determination image pattern with light illuminance information set corresponding to the fake-determination image pattern; and
a fingerprint analyzer configured to perform the fingerprint authentication by comparing second sensing data corresponding to the fingerprint sensing area with registered fingerprint data.

10. The display device of claim 9, wherein the fingerprint detector further includes:
a memory configured to store the light illuminance information corresponding to the fake-determination image pattern and the registered fingerprint data; and
a use approval determiner configured to finally determine whether use of the display device is to be approved, based on a result of the fake fingerprint determination and a result of the fingerprint authentication.

11. The display device of claim 9, wherein the pattern controller randomly changes the fake-determination image pattern displayed on the display panel in a predetermined period.

12. The display device of claim 9, wherein the pattern controller generates the fake-determination image pattern in a first period, and suspends the generation of the fake-determination image pattern in a second period.

13. The display device of claim 12,
wherein the fake fingerprint detector performs the fake fingerprint determination by using the first sensing data in the first period, and
wherein the fingerprint analyzer performs the fingerprint authentication by using the second sensing data in the second period.

14. The display device of claim 9, wherein the fingerprint analyzer is configured to perform the fingerprint authentication by comparing the second sensing data corresponding to the fingerprint sensing area except the first pattern with the registered fingerprint data.

15. A method for driving a display device, the method comprising:
displaying a first image including user convenience information through a display panel, the user convenience information including a first pattern of a fake-determination image pattern having a first planar shape;
generating sensing data corresponding to a fingerprint sensing area by using a photoelectric sensor; and
determining whether a sensed fingerprint corresponding to the sensing data is a fake fingerprint by comparing expected sensing light illuminance information based on the first image with sensed light illuminance information of the sensing data; and
displaying a second image in which light is emitted in the entire fingerprint sensing area, based on a touch input,
wherein the user convenience information includes an indication image indicating the fingerprint sensing area, and
wherein the indication image includes the first pattern.

16. The method of claim 15, wherein, when the display panel is power-on, the first image is displayed based on the power-on of the display panel.

17. The method of claim 15,
wherein the display panel displays a general image having a first refresh rate in a first mode, and displays a power-saving image having a second refresh rate smaller than the first refresh rate in a second mode.

18. The method of claim 17, wherein the power-saving image includes the first image.

19. The method of claim 15, further comprising:
performing fingerprint authentication by comparing the sensing data with registered fingerprint data.

20. The method of claim 19, further comprising determining whether use of the display device is to be approved, based on a result of the fingerprint authentication and a result of fake fingerprint determination.

* * * * *